United States Patent
Okabe et al.

(10) Patent No.: US 9,451,583 B2
(45) Date of Patent: *Sep. 20, 2016

(54) COMMUNICATION METHOD, MOBILE NETWORK SYSTEM AND DEVICE

(75) Inventors: Junya Okabe, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/381,746

(22) PCT Filed: Apr. 27, 2011

(86) PCT No.: PCT/JP2011/060215
§ 371 (c)(1),
(2), (4) Date: Aug. 13, 2012

(87) PCT Pub. No.: WO2011/136248
PCT Pub. Date: Nov. 3, 2011

(65) Prior Publication Data
US 2012/0300640 A1    Nov. 29, 2012

(30) Foreign Application Priority Data

Apr. 27, 2010   (JP) ................ 2010-102166

(51) Int. Cl.
| | | |
|---|---|---|
| *H04M 3/42* | (2006.01) | |
| *H04W 68/00* | (2009.01) | |
| *H04W 76/04* | (2009.01) | |
| *H04W 8/02* | (2009.01) | |
| *H04W 76/02* | (2009.01) | |
| *H04W 76/06* | (2009.01) | |

(52) U.S. Cl.
CPC ............ *H04W 68/005* (2013.01); *H04W 8/02* (2013.01); *H04W 76/045* (2013.01); *H04W 76/028* (2013.01); *H04W 76/064* (2013.01); *H04W 76/068* (2013.01)

(58) Field of Classification Search
CPC .......... H04W 76/045; H04W 76/028; H04W 76/068; H04W 76/064
USPC ..................................................... 370/241
See application file for complete search history.

(56) References Cited

U.S. PATENT DOCUMENTS

| | | |
|---|---|---|
| 2008/0074994 A1 | 3/2008 | Jen |
| 2008/0076404 A1 | 3/2008 | Jen |
| 2008/0076405 A1 | 3/2008 | Jen |
| 2009/0239526 A1* | 9/2009 | Zhao et al. .................. 455/424 |

(Continued)

FOREIGN PATENT DOCUMENTS

| | | |
|---|---|---|
| CN | 101472256 A | 7/2009 |
| EP | 2 346 219 A1 | 7/2011 |

(Continued)

OTHER PUBLICATIONS

Japanese Office Action dated Feb. 3, 2012, with partial English translation.

(Continued)

*Primary Examiner* — Luat Phung
(74) *Attorney, Agent, or Firm* — McGinn IP Law Group, PLLC

(57) ABSTRACT

A bearer management node maintains specific bearers eligible for restoration of communication services, while removing other bearers.

29 Claims, 24 Drawing Sheets

(56) References Cited

U.S. PATENT DOCUMENTS

| | | | |
|---|---|---|---|
| 2009/0285157 A1 | 11/2009 | Yeoum et al. | |
| 2009/0325634 A1 | 12/2009 | Bienas et al. | |
| 2010/0056147 A1 | 3/2010 | Sun et al. | |
| 2010/0080116 A1* | 4/2010 | Agashe et al. | 370/216 |
| 2010/0142467 A1 | 6/2010 | Tiirola et al. | |
| 2010/0165937 A1 | 7/2010 | Yi et al. | |
| 2010/0208596 A1* | 8/2010 | Jin | 370/242 |
| 2010/0220643 A1 | 9/2010 | Qi et al. | |
| 2010/0260115 A1 | 10/2010 | Frederiksen et al. | |
| 2011/0019637 A1 | 1/2011 | Ojala et al. | |
| 2011/0075675 A1* | 3/2011 | Koodli et al. | 370/401 |
| 2011/0103277 A1 | 5/2011 | Watfa et al. | |
| 2011/0138033 A1* | 6/2011 | Yang et al. | 709/223 |
| 2011/0194406 A1* | 8/2011 | Ye et al. | 370/225 |
| 2012/0094627 A1* | 4/2012 | Suh et al. | 455/404.1 |
| 2012/0172066 A1 | 7/2012 | Okabe et al. | |
| 2012/0178479 A1 | 7/2012 | Okabe et al. | |
| 2012/0202496 A1 | 8/2012 | Okabe et al. | |
| 2012/0202532 A1 | 8/2012 | Okabe et al. | |
| 2012/0214519 A1 | 8/2012 | Okabe et al. | |

FOREIGN PATENT DOCUMENTS

| | | |
|---|---|---|
| JP | 2008-079313 A | 4/2008 |
| JP | 2010-45429 A | 2/2010 |
| WO | WO 03/039186 A1 | 5/2003 |
| WO | WO 03/041435 A1 | 5/2003 |
| WO | WO 2010/043094 A1 | 4/2009 |
| WO | WO 2009/121255 A1 | 10/2009 |
| WO | WO 2010/019364 A1 | 2/2010 |

OTHER PUBLICATIONS

Ericsson, Cleanup of hanging PDN connections/bearers, C4-100406, 3GPP, Feb. 26, 2010, URL, http://www.3gpp.org/ftp/tsg_ct/WG4_protocollars_ex-CN4/, TSGCT4_48_San_Francisco/docs/C4-100406.zip.
Previously filed on Dec. 30, 2011.
3GPP TR 23.857, Technical Specification Group Core Network and Terminals; Study of EPC Nodes Restoration; (Release 10), Mobile Competence Centre; 650, Route Des Lucioles; F-06921 Sophia-Antipolis Cedex; France, No. V1.2.0, Mar. 7, 2011, pp. 1-31, XP050476278.
NEC: "EPC node failure", 3GPP Draft; C4-101116, Mobile Competence Centre; 650, Route Des Lucioles; F-06921 Sophia-Antipolis Cedex; France, vol. CT WG4, no. Kyoto; 20100510, May 17, 2010, XP050411725.
3GPP TS 23.007, $3^{rd}$ Generation Partnership Project; Technical Specification Group Core Network and Terminals; Restoration procedures (Release 9), Mobile Competence Centre; 650, Route Des Lucioles; F-06921 Sophia-Antipolis Cedex; France, No. V9.3.0, Apr. 6, 2010, pp. 1-39, XP050402405.
CATT: "Clarifying the bearers to be deactivated on the S5/S8 interface", 3GPP Draft; C4-100955 (WAS 100924 CR0544), Mobile Competence Centre; 650, Route Des Lucioles; F-06921 Sophia-Antipolis Cedex; France, vol. CT WG4, no. San Francisco, US; 20100222, Mar. 2, 2010; XP050411498.
Ericsson: Discussion paper on the handling of hanging PDN connections/bearers Specs: 3GPP TS 23.007, 3GPP TS 29.274, 3GPP Draft; C4-100405, Mobile Competence Centre; 650, Route Des Lucioles; F-06921 Sophia-Antipolis Cedex; France, vol. CT WG4, no. San Francisco, US; 20100222, Mar. 2, 2010, XP050411046.
3GPP: "3GPP TS 23.401; Technical Specification Group Services and System Aspects; General Packet Radio Service (GPRS) enhancements for Evolved Universal Terrestrial Radio Access Network (E-UTRAN) access (Release 9)", 3GPP Standard; Mobile Competence Centre; 650, Route Des Lucioles; F-06921 Sophia-Antipolis Cedex; France, No. V9.4.0, Mar. 25, 2010, pp. 1-258, XP050402066.
Extended European Search Report dated Jun. 5, 2012, filed in U.S. Appl. No. 13/421,575.
Extended European Search Report dated Jun. 1, 2012, filed in U.S. Appl. No. 13/421,586.
Extended European Search Report dated Jun. 1, 2012, filed in U.S. Appl. No. 13/421,602.
Extended European Search Report dated Jun. 1, 2012, filed in U.S. Appl. No. 13/421,621.
Extended European Search Report dated Jun. 1, 2012, filed in U.S. Appl. No. 13/421,628.
Extended European Search Report dated Jun. 4, 2012, filed in U.S. Appl. No. 13/421,641.
3GPP TR 23.857, Technical Specification Group Core Network and Terminals; Study of EPC Nodes Restoration; (Release 10), Mobile Competence Centre; 650, Route Des Lucioles; F-06921 Sophia-Antipolis Cedex; France, No. V1.2.0, Mar. 7, 2011, pp. 1-31, XP050476278 (Previously filed on Aug. 24, 2012).
NEC: "EPC node failure", 3GPP Draft; C4-101116, Mobile Competence Centre; 650, Route Des Lucioles; F-06921 Sophia-Antipolis Cedex; France, vol. CT WG4, no. Kyoto; 20100510, May 17, 2010, XP050411725 (Previously filed on Aug. 24, 2012).
3GPP TS 23.007, $3^{rd}$ Generation Partnership Project; Technical Specification Group Core Network and Terminals; Restoration procedures (Release 9), Mobile Competence Centre; 650, Route Des Lucioles; F-06921 Sophia-Antipolis Cedex; France, No. V9.3.0, Apr. 6, 2010, pp. 1-39, XP050402405. (Previously filed on Aug. 24, 2012).
CATT: "Clarifying the bearers to be deactivated on the S5/S8 interface", 3GPP Draft; C4-100955 (WAS 100924 CR0544), Mobile Competence Centre; 650, Route Des Lucioles; F-06921 Sophia-Antipolis Cedex; France, vol. CT WG4, no. San Francisco, US; 20100222, Mar. 2, 2010; XP050411498 (Previously filed on Aug. 24, 2012).
Ericsson: Discussion paper on the handling of hanging PDN connections/bearers Specs: 3GPP TS 23.007, 3GPP TS 29.274, 3GPP Draft; C4-100405, Mobile Competence Centre; 650, Route Des Lucioles; F-06921 Sophia-Antipolis Cedex; France, vol. CT WG4, no. San Francisco, US; 20100222, Mar. 2, 2010, XP050411046 (Previously filed on Aug. 24, 2012).
Ericsson: "Cleanup of hanging PDN connections/bearers", 3GPP Draft; C4-1004062_WAS093573_23007_Cleanup_Hanging_PDN_Connections_DBR_DSR_REL9, $3^{rd}$ Generation Partnership Project (3GPP), Mobile Competence Centre; 650, Route Des Lucioles; F-06921 Sophia-Antipolis Cedex; France, vol. CT WG4, no. San Francisco, US; 20100222, Mar. 2, 2010, XP050411047.
3GPP: "3GPP TS 23.401; Technical Specification Group Services and System Aspects; General Packet Radio Service (GPRS) enhancements for Evolved Universal Terrestrial Radio Access Network (E-UTRAN) access (Release 9)", 3GPP Standard; Mobile Competence Centre; 650, Route Des Lucioles; F-06921 Sophia-Antipolis Cedex; France, No. V9.4.0, Mar. 25, 2010, pp. 1-258, XP050402066. (Previously filed on Aug. 24, 2012).
Extended European Search Report dated Jul. 19, 2012.
Alcatel-Lucent, "The LTE Network Architecture—A comprehensive tutorial", 2009, Strategic White Paper.
US Office Action dated Oct. 24, 2012 in co-pending related U.S. Appl. No. 13/421,586.
US Office Action dated Dec. 4, 2012 in co-pending related U.S. Appl. No. 13/421,641.
3GPP TS 23.20. V9.4.0.,$3^{rd}$ Generation Partnership Project; Technical Specification Group Services and System Aspects; Policy and charing control architecture (Release 9), Mar. 2010, 11.1 Restart of the SGSN.
3GPP TS 23.272 V9.3.0, $3^{rd}$ Generation Partnership Project; Technical Specification Group Services and System Aspects; Circuit Switched (CS) fallback in Evolved Packet System (EPS); Stage 2 (Release 9), Mar. 2010, 11.1 Restart of the SGSN.
3GPP TS 23.007 V9.3.0, $3^{rd}$ Generation Partnership Project; Technical Specification Group Core Network and Terminals; Restoration procedures (Release 9), Mar. 2010, 11.1 Restart of the SGSN.
International Search Report in PCT/JP2011/060215 dated Jul. 5, 2011 (English Translation Thereof).
US Office Action dated Jan. 8, 2013 in co-pending related U.S. Appl. No. 13/421,621.

(56) References Cited

OTHER PUBLICATIONS

US Office Action dated Mar. 7, 2013 in co-pending related U.S. Appl. No. 13/421,575.
US Office Action dated Mar. 7, 2013 in co-pending related U.S. Appl. No. 13/421,602.
US Office Action dated Mar. 13, 2013 in co-pending related U.S. Appl. No. 13/421,586.
3GPP TS 23.007 V9.3.0 (Mar. 2010) 3d Generation Partnership Project; technical specification group Core Network and Terminals; Restoration Procedures (Release 9).
US Office Action dated Jan. 11, 2013 in co-pending related U.S. Appl. No. 13/421,628.
3GPP TS 23.007 V10.0.0 (Jun. 2010): 3rd Generation Partnership Project; Technical Specification Group Core Network and Terminals; Restoration procedures (Release 10).
US Notice of Allowance and Fee(s) Due dated Apr. 15, 2013 in co-pending related U.S. Appl. No. 13/421,628.
US Notice of Allowance and Fee(s) Due dated Jul. 5, 2013 in co-pending related U.S. Appl. No. 13/421,575.
US Office Action dated Jul. 24, 2013 in co-pending related U.S. Appl. No. 13/421,621.
Chinese Office Action dated Oct. 14, 2014 with an English Translation thereof.
US Office Action in co-pending related U.S. Appl. No. 13/421,641.
United States Office Action dated Mar. 26, 2014 in the U.S. Appl. No. 13/421,586.
Pierre Lescuyer, Thierry Lucidarme, The LTE and SAE Evolution of 3G UMTS, Feb. 11, 2008, John Wiley & Sons.
Japanese Office Action dated Feb. 25, 2015 with partial English Translation.
U.S. Office Action dated Jan. 24, 2014 in co-pending related U.S. Appl. No. 13/421,575.
Japanese Office Action dated Oct. 6, 2015 with a partial English translation.
3GPP TS 29.118 v.9.0.0 (Dec. 2009) $3^{rd}$ Generation Partnership Project; Technical Specification Group Core Network and Terminals; Mobility Management Entity (MME)—Visitor Location Register (VLR) SGs interface specification (Release 9).
United States Office Action dated Apr. 30, 2014 in the U.S. Appl. No. 13/421,575.
United States Office Action dated Nov. 23, 2015 in co-pending U.S. Appl. No. 14/584,710.
3GPP TS 29.118 v8.1.0; "Mobility Management Entity (MME)—Visitor Location Register (VLR) SGs interface specification"; Release 8; Mar. 2009.

* cited by examiner

COMMUNICATION METHOD, MOBILE NETWORK SYSTEM AND DEVICE

TECHNICAL FIELD

DESCRIPTION OF RELATED APPLICATION

The present application asserts priority rights based on JP Patent Application 2010-102166 filed on Apr. 27, 2010. The total contents of disclosure of the Patent Application of the senior filing date are to be incorporated by reference into the present Application.

This invention relates to a communication network and, more particularly, to a system and a method as well as an apparatus that may be applied to advantage to the next-generation mobile network system EPC (Evolved Packet Core).

The following recites certain abbreviations used in the present specification.

CS: Circuit Switched
CSFB: Circuit Switched Fall Back
eNodeB (eNB): evolved NodeB
G-MSC: Gateway Mobile Switch Center
GPRS: General Packet Radio Service
GTP-C: (GPRS Tunneling Protocol Control Plane)
GTP-U: (GPRS Tunneling Protocol User Plane)
P-MIP: Proxy Mobile Internet Protocol
HSS: Home Subscriber Server
IMS: IP Multimedia Subsystem
IMSI: International Mobile-Station Subscription Identifier
ISR: Idlemode Signaling Reduction
LTE: Long Term Evolution
MME: Mobility Management Entity
MSC: Mobile Switching Center
MTC: Machine type communication
P-GW: (PGW or PDN-GW): Packet Data Network Gateway
PDN: Packet Data Network
QCI: QoS Class Identifier
RAI: Routing Area Identity
RNC: Radio Network Controller
S-GW (or SGW): Serving Gateway
SGSN: Serving GPRS Support Node
SMS: Short Message Service
SCPT: Stream Control Transmission Protocol
TA List: Tracking Area List
TAU: Tracking Area Update
TEID: Tunnel Endpoint Identifier
GRE key: Generic Routing Encapsulation Key
UE: User Equipment
UMTS: Universal Mobile Telecommunications System
VLR: Visited Location Register
3G: Third Generation
  3GPP: 3rd Generation Partnership Project

BACKGROUND

The next-generation mobile network system EPC is a network architecture that accommodates 3G (third generation mobile phone communication system), LTE and so forth in one network. The following describes several network nodes.

A MME is a mobility management node. In LTE radio access, the MME takes charge of mobility management (mobility control), such as tracking, of an idle-mode mobile station (UE), authentication and setting up a user data forwarding path between an S-GW and a base station (eNodeB), in LTE radio access. The mobile station (UE) is also termed 'a user apparatus', 'a mobile terminal' or simply 'a terminal'. The MME is involved in tracking and paging of idle-mode UEs or in bearer activate/deactivate processes. The MME selects the S-GW at the time of handover of the UE TE and performs authentication along with HSS. It is noted that a bearer means a logical packet transmission path set up between eNodeB and S-GW/P-GW or the like.

An SGSN is a mobility management node in the 3G core network. It is a packet switching unit that takes charge of mobility management for the UEs, such as serving subscriber management, serving subscriber mobility management, originating/incoming call control, tunneling control, charging control, QoS (Quality of Service) control or the like.

When the UE is in an idle or power-saving state (LTE-idle) in an LTE core network, the UE is identified at the accuracy corresponding to a tracking area list (TA List) composed of a plurality of cells (MME maintains the latest updated TA List). At the time of an incoming call to the mobile station, paging is performed using the latest TA List registered last time. The SGSN of the 3G core network performs paging in an RA (Routing Area).

An S-GW performs routing and forwarding of a user data packet. The S-GW is a bearer management node that manages context of the UE (a parameter of IP bearer service or the like). In response to a bearer setting request from an MME that has received an attach request from the UE, The S-GW sets a path setting request for a P-GW and bearer in the direction of an eNode. The S-GW also performs triggering of a paging when the downlink (DL) data to a terminal has arrived.

A P-GW takes charge of connection of the UE to a packet data network (a service network: Web browsing service or an external network, such as IMS or the like.

The following describes restarting of MME/SGSN.

The 'restart' or 'restart of MME/SGSN' means cessation of service due to failure, or intentional cessation of service for maintenance, that leads to initialization setting operation in the MME/SGSN, as a result of which, subscriber information or bearer information that is necessary for the MME/SGSN operation to operate is lost.

Non-Patent Document 2 (3GPP TS 23.007) provides that, when the S-GW detects that the MME/SGSN has restarted, the S-GW is to release bearer context of the UE registered in the MME/SGSN that has restarted. That is, According to Non-Patent Document 2, when the MME re-starts after failure, the MME removes the entirety of bearer contexts affected by the restarting. When the S-GW detects that the MME has restarted, the S-GW removes PDN connection table/bearer context corresponding to the MME that has restarted and releases inner resources relevant to the PDN connection.

Assuming that an S-GW operates in accordance with the above specification of the Non-Patent Document 2, when the MME operation has restarted, the S-GW is unable to effect a packet incoming operation to the UE until originating a call by the mobile station itself or periodic location registration (e.g., Attach/TAU Request) periodically by performed by the UE itself to the MME.

When there is an incoming call to the UE, the network performs paging all at once to whole cells associated with an area where the UE has made location registration (tracking area). The so paged UE accesses a serving cell and establishes a call. However, according to the specification of Non-Patent Document 2, the entirety of bearer information or resources of the restarted MME has already been removed or released. That is, in the S-GW, radio access bearers in the direction of from the S-GW to the eNodeB and session information between the MME and the S-GW have been removed or released, so that when the incoming packet data to the UE is received only to no effect.

In the S-GW in this state, TEID or GRE Key, as the identification information of a tunnel (GTP-U or P-MIP), a transport protocol between the S-GW and the P-GW, also has been removed. Hence, in the S-GW, the incoming data is rejected. The P-GW also removes relevant resources in response to the rejection of the incoming packet data from the S-GW.

Non-Patent Document 1:
3GPP TS 23.203 V9.4.0 (2010-03) 3rd Generation Partnership Project: Technical Specification Group Services and System Aspects: Policy and charging control architecture (Release 9), page 31, Table 6.1.7: Standardized QCI characteristics Non-Patent Document 2:
3GPP TS 23.007 V9.3.0 (2010-03) 3rd Generation Partnership Project: Technical Specification Group Core Network and Terminals; Restoration procedures (Release 9), pages 27-28

Non-Patent Document 3:
3GPP TS 23.272 V9.3.0 (2010-03) 3rd Generation Partnership Project: Technical Specification Group Services and System Aspect; Circuit Switched (CS) fallback In Evolved Packet System (EPS); Stage 2 (Release 9) pages 26-27

SUMMARY

The disclosures of the Non-Patent Documents 1 to 3 are incorporated by reference into the present specification. The following is an analysis of the related techniques.

In case the S-GW operates in accordance with the above specification of Non-Patent Document 2, as described above, the S-GW which has detected the restarting of the mobility management node MME/SGSN releases entirety of bearers of the UE registered in the MME/SGSN where restarting occurred.

Hence, the incoming to the UE after the restarting the mobility management node MME/SGSN may not be informed to the UE until such time the attach operation for registration in the network is carried out in the UE. That is, if, during the time that elapses after restarting of the MME/SGSN until the end of the attachment operation, triggered by the origination by the UE itself or the periodic location registration by the UE, the UE is unable to have a communication service, even if there is an incoming of the communication service. For example, during a time interval of the periodic location registration (TAU request) (e.g., up to 45 minutes), following the restarting of the MME/SGSN, incoming packet data, addressed to the UE, may not be delivered to the UE.

That is, a packet communication service is at a standstill. This poses a serious problem since communication services as social infrastructure may not be received for a preset time in case IMS is exploited on an EPS network.

Accordingly, it is an object of the present invention to provide a system, a method and an apparatus which enable to accelerate restoration of communication services for the UE after restarting of a mobility management node.

In accordance with one aspect of the present invention, there is provided a communication method in which a bearer management node maintains a specific bearer eligible for restoration of communication services, and removes the other bearers. In case a mobility management node is restarted, the bearer management node maintains at least one bearer.

In accordance with another aspect of the present invention, there is provided a communication method wherein, on restarting of a mobility management node, a circuit switched node sends to the mobility management node a notification message including identification information associated with the UE and location registration area information, and the mobility management node starts paging, inclusive of the identification information associated with the UE, for an area corresponding to the location registration area information.

According to the present invention, there is also provided a mobile network system in which a bearer management node maintains a specific bearer eligible for restoration of communication services, and removes other bearers. The mobile network system includes a mobility management node and a bearer management node. When restarting of the mobility management node is performed, the bearer management node maintains at least one of the bearers as set.

According to the present invention, there is provided a mobile network system comprising a mobility management node and a circuit switched node. In case restarting of the mobility management node is performed, the circuit switched node sends to the mobility management node a notification message inclusive of the identification information associated with the UE and the location registration area information. The management node performs paging including the identification information associated with the UE for an area corresponding to the location registration area information.

According to the present invention, there is provided a node apparatus that manages a bearer, wherein the node apparatus maintains a specific bearer eligible for restoration of communication services, and removes other bearers. In case restarting of the mobility management node is performed, the node apparatus maintains at least one of the bearers as set.

According to the present invention, it is possible to accelerate restoration of a communication service for a mobile station following restarting of a mobility management node.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

In one of preferred modes of the present invention, when a mobility management node, such as the MME/SGSN, has restarted, a bearer management node (S-GW) does not release all of bearers relevant to the mobility management node (MME/SGSN). The bearer management node (S-GW) holds at least part of or entirety of hearers to continue a packet incoming service. That is, when the bearer management node, such as the S-GW, detects restarting of the mobility management node (MME/SGSN), the bearer management node confirms that the UE is accommodated in the mobility management node (MME/SGSN). In connection with the UE, accommodated in the mobility management node (MME/SGSN), the bearer management node, such as S-GW, retains at least one of bearers set between the bearer management node (S-GW) and the external network, such as PDN. By so doing, the UE is able to attach to the network, with packet incoming from the external network (PDN) to the UE as a trigger, thereby accelerating the restoration of a communication service for the UE. In one of preferred modes of the present invention, the bearer management node maintains a specific bearer(s) for restoring a communication service, and removes other bearers. In one of preferred modes of the present invention, when maintaining the specific bearer, the bearer management node may start a timer. On timeout of the timer, the bearer management node may remove bearer resources that have been maintained.

In one of preferred modes of the present invention, it is possible to select those bearers that render services of high reliability after restarting of the mobility management node (MME/SGSN). It is thus possible to suppress consumption of resources of the bearer management node (S-GW) as well as to avoid congestion due to massive location registration signals.

In one of preferred modes of the present invention, the bearer management node S-GW maintains the location registration area information (TA List/RAI) of the UE, informed from the mobility management node (MME/SGSN), and the identification information (IMSI) associated with the UE. After restarting of the mobility management node (MME/SGSN), the bearer management node (S-GW) may, on receipt of incoming data to the UE, notify the location registration area information (TA list/RAI) and the identification information (IMSI) to the mobility management node (MME/SGSN). The mobility management node (MME/SGSN) may then perform paging, using the identification information (IMSI), for only the area corresponding to the location registration area information (TA list/RAI). By so doing, it is possible to selectively reduce an area that is paced by the base station.

Figure 1:
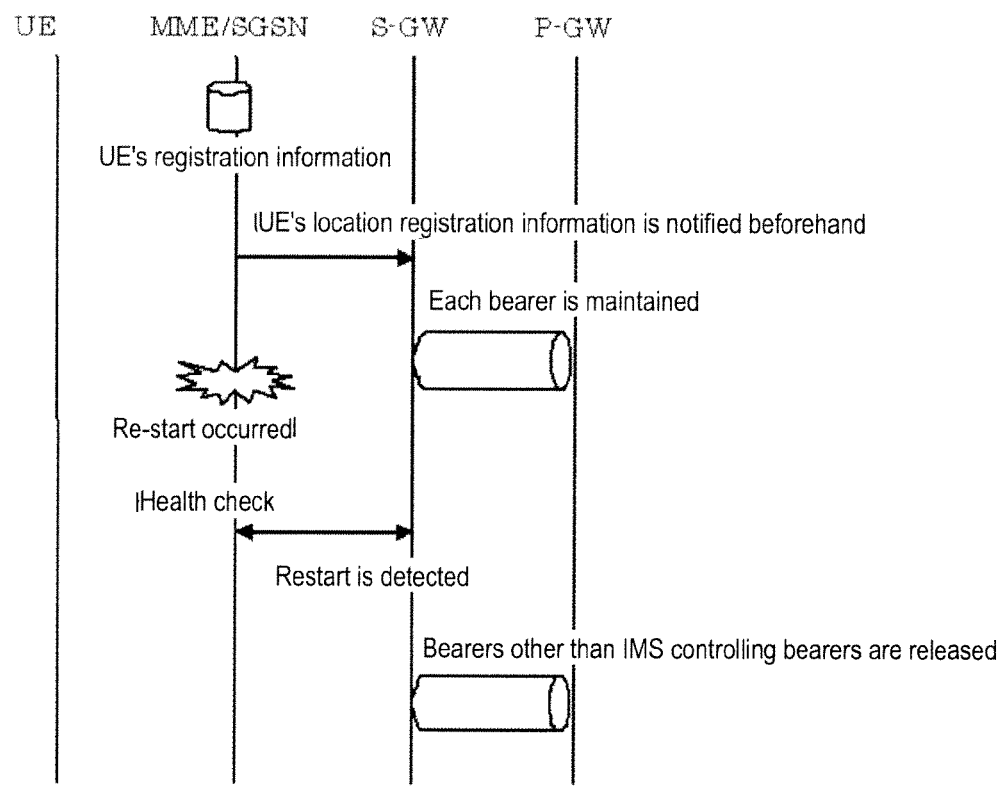
FIG. 1 is a diagram for illustrating the operation of a mode of the present invention.

FIG. 1 is a diagram for illustrating one of modes of the present invention. A mobility management node MME/SGSN that manages registration information of a mobile station UE, notifies the location registration information of the UE to an S-GW at the outset. The S -GW maintains the location registration information of the UE. The S-GW also maintains bearers between the S-GW and the P-GW.

Restarting occurs at the mobility management node MME/SGSN.

When the S-GW detects, by e.g., health check, that the mobility management node (MME/SGSN) has restarted, the S-GW does not release but maintains bearers that are set between the S-GW and the P-GW. In this case, in view of compatibility of the stable system restoration and availability of communication services, it is possible for the S-GW not to release but continue to maintain those bearers that will provide for high availability services. These services may be exemplified by communication that is in need of high reliability in accordance with, e.g., of the operator policy, such as voice services provided by IMS. For example, the S-GW may not release but maintain specific S5/S8 bearers between the S-GW and the P-GW, necessary for restoration of services initiated from the network side, and to delete all the other S5/S8 bearers.

Figure 2:
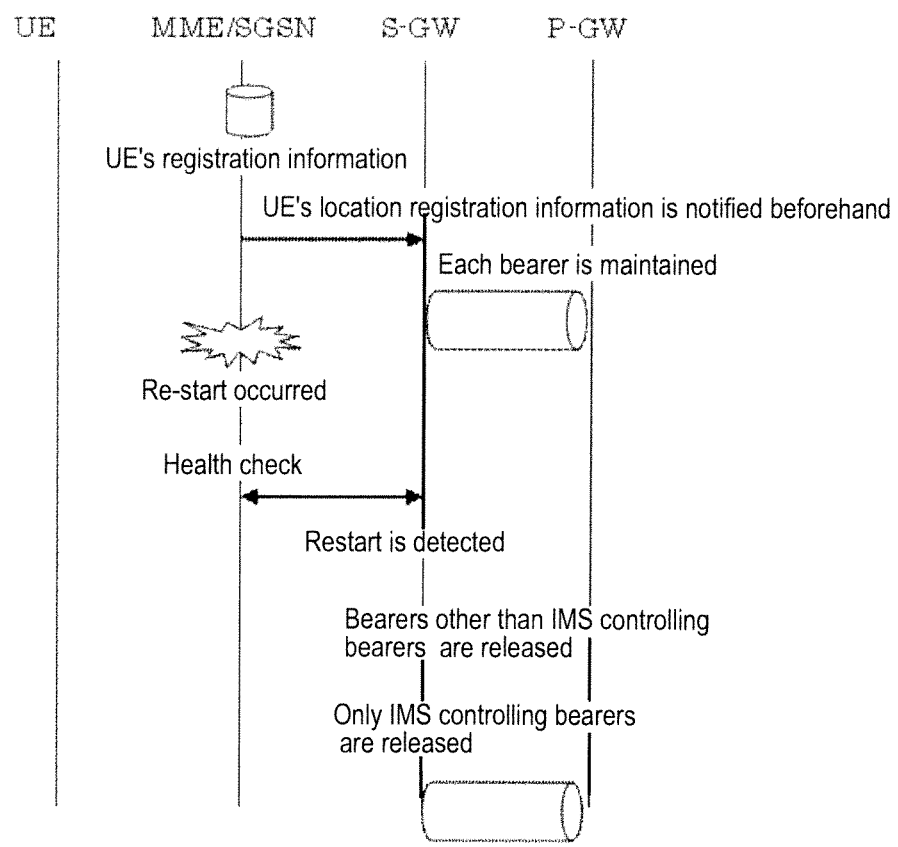
FIG. 2 is another diagram for illustrating the operation of the mode of the present invention.

In an example shown in FIG. 2, when the S-GW detects, by e.g., health check (GTP-echo), that the mobility management node MME/SGSN has ted, the S-GW releases IMS control bearer services, among bearers set between the S-GW and the P-GW, while maintaining just the hearers used for IMS signaling. By thus applying to just specific services, it is also possible to gradually restore the MME/SGSN while overload on the entire system is avoided.

Figure 3:
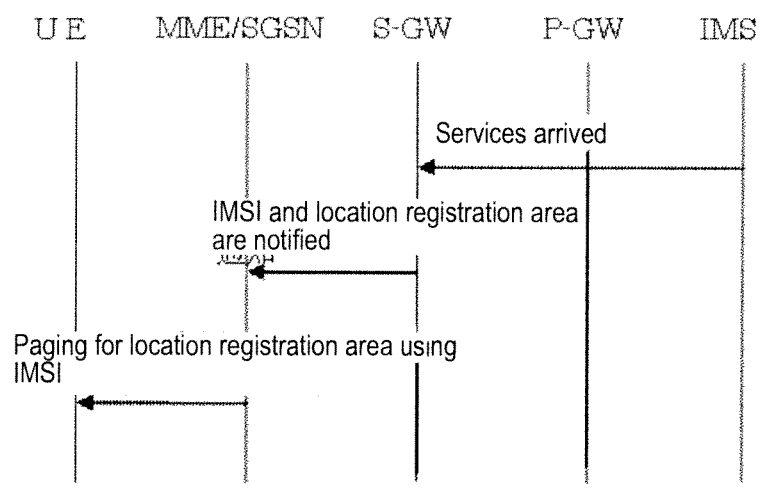
FIG. 3 is yet another diagram for illustrating the operation of the mode of the present invention.

FIG. 3 is a diagram for illustrating the case of applying the present invention to IMS services. When packet data has arrived, using the bearer held by the S-GW, the packet incoming is notified, along with the IMSI identifying the UE and the location registration area information, registered beforehand in the S-GW, to the MME/SGSN where the restarting has occurred. The MME/SGSN is thus able to call(page) the UE using the IMSI and the location registration area information. The mobile station UE that has been paged using the IMSI, performs re-registering (attach) to the MME/SGSN and re-establishes necessary bearers to receive the entirety of packet communication services. Thus, according to a mode of the present invention, even if the MME/SGSN restarts, service arrival may be notified to the UE to prompt its attachment to the MME to improve availability of communication services.

According to a mode of the present invention, it is possible to cause a UE to attach to the network, after restarting of the MME/SGSN, with the incoming of the packet to the UE as a trigger. Packet communication services may instantaneously be restored to the UE whose services have been started by the arrival of the incoming packet.

In a mode of the present invention, just those bearers that need high reliability may be taken as bearers to be maintained according to the present invention. It is thus possible to suppress consumption of S-GW resources as well as congestion due to massive location registration signals. This operation is indispensable especially in case a UE where packet communication occurs periodically, as in MTC, is accommodated. The reason is that, in such case, packet communication occurs for many UEs after restarting of the MME/SGSN, and hence the subscriber recovering operations may occur in a burst fashion, with the packet communication as a trigger, thus possibly leading to congestion of the system in its entirety.

Figure 4:
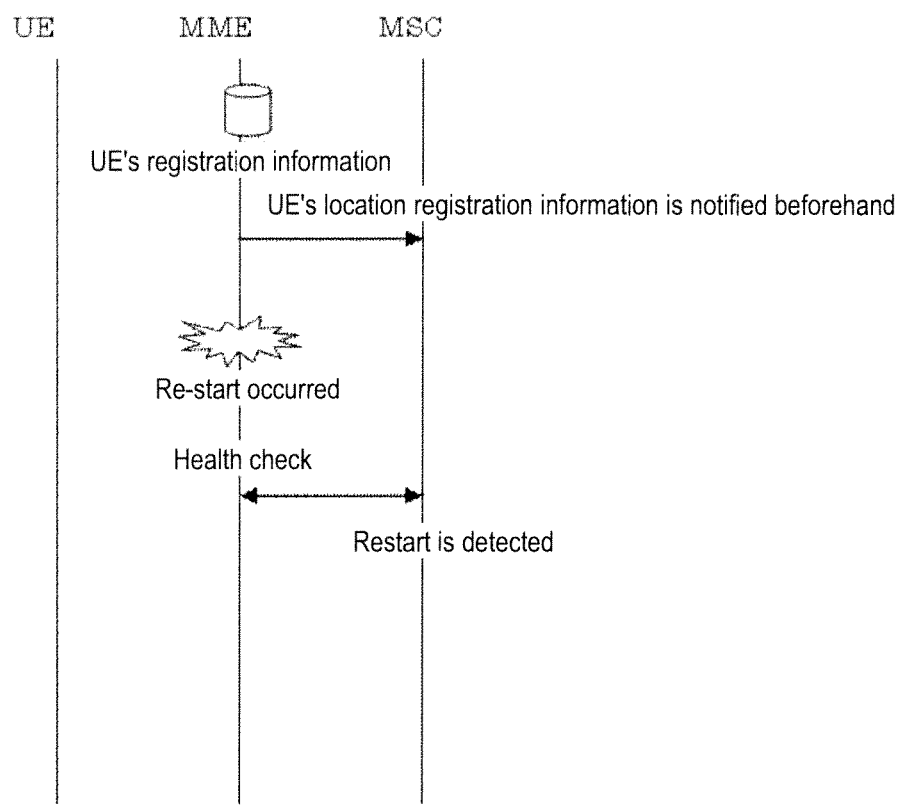
FIG. 4 is yet another diagram for illustrating the operation of the mode of the present invention.
Figure 5:
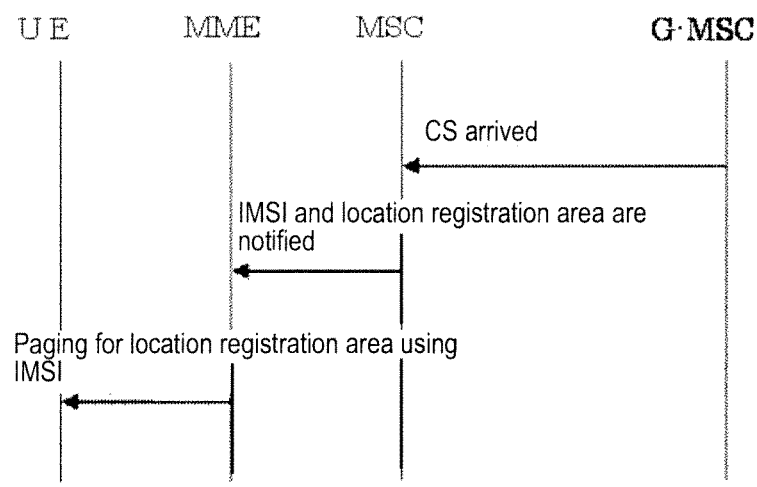
FIG. 5 is yet another diagram for illustrating the operation of the mode of the present invention.

FIGS. 4 and 5 are diagrams showing an example in which the present invention is applied to CSFB. The CSFB function switches voice origination/incoming to 3G to render voice services employing the 3G-CS domain even in case VoIP services are not provided on LTE. As regards the CSFB function, reference is to be made to Non-Patent Document 3 (FIG. 7.2-1 Mobile Termination Call in idle mode).

Referring to FIG. 4, the MME notifies the UE's location registration information to an MSC in advance. When the MME restarts, the MSC detects the restarting of the MME by e.g., health check. Referring to FIG. 5, when a call arrived from an originating side G-MSC (CS incoming), the MSC notifies the IMSI and the location registration area to the MME, which MME is able to call (page) the UE using the IMSI and the location registration area information.

The following describes exemplary embodiments of the present invention. FIGS. 6 to 9 show networks to which the present invention may be applied.

<Exemplary Embodiment 1>

Figure 6:
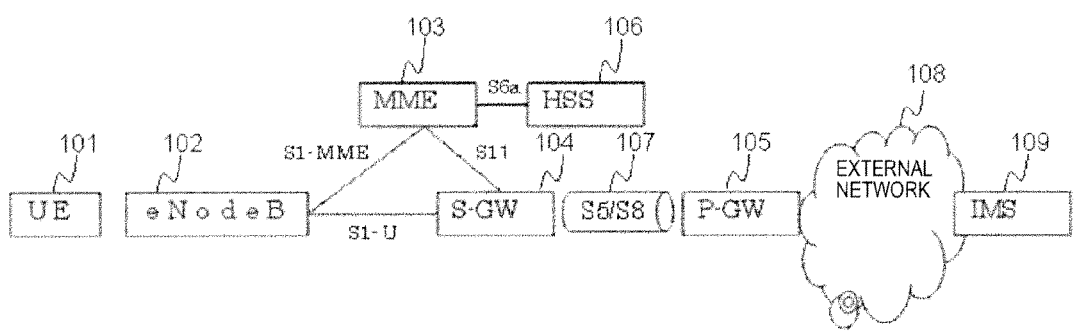
FIG. 6 is a diagram for illustrating a packet communication network that accommodates LTE.

FIG. 6 is a diagram showing a network configuration of an exemplary embodiment 1 of the present invention. Specifically, FIG. 6 shows a packet communication network that accommodates LTE. Referring to FIG. 6, the network includes a UE 101, a base station (eNodeB) 102, a MME 103, an HSS 106, an S-GW 104, a P-GW 105, an external network (PDN) 108 and an IMS 109. The IMS 109 is a communication system that integrates packet switched communication services by SIP (Session n Protocol) to implement multi-media services.

The MME 103 accommodates the eNodeB 102 by an SI-MME interface to perform UE mobility management and authentication as well as setting of a user forwarding path. The MME 103 refers to the HSS 106 that is a database for managing subscriber information, through an S6a interface, to perform e.g., authentication. The MME 103 transmits/receives a control signal via S1-MME and S11 interfaces to set up or release the user forwarding path on an S1-U interface between the eNodeB and the S-GW. The transport protocol at the S1-U interface between the eNodeB and the S-GW is GTP-U.

An S5/S8 interface 107 is an interface (user plane) between S-GW and P-GW. As a transport protocol, a tunneling protocol (GTP-U) or a proxy mobile IP protocol (P-MIP), is set.

The S-GW 104 performs user data transmission/reception between it and the eNodeB 102, while setting up or releasing an external PDN based transmission path via P-GW and S5/S8 interface 107. The P-GW 105 connects to the external network (PDN) 108 over an SGi interface. The following describes an operation when the MME restarts.

<First Stage>

Figure 10:
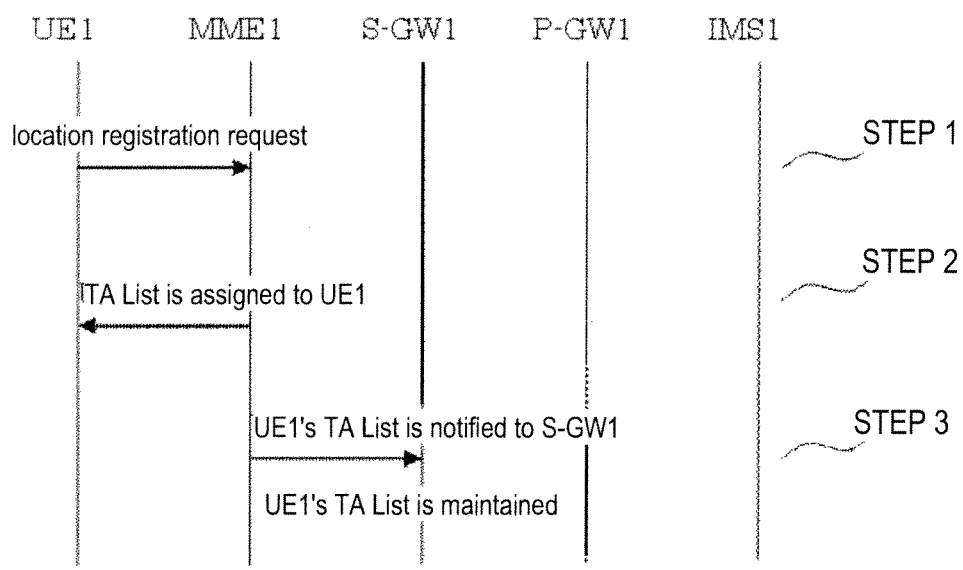
FIG. 10 is a diagram for illustrating an example sequence of an exemplary embodiment 1 of the present invention.

FIG. 10 is a sequence diagram that illustrates, as a first stage, a stage of registering location registration area information of the UE in the S-GW. In FIG. 10, the base station (eNodeB) 102 of FIG. 6 is omitted. It is premised that the UE1 has set up a radio control link between it and the eNodeB. The respective steps of FIG. 10 will now be described.

In a step 1 of FIG. 10, the UE1 transmits a location registration request (Attach Request or TAU Request) to the MME 1. Note that, in LTE, the location of the UE in an idle (standby) mode is managed per location registration area information (tracking area). Each tracking area corresponds to a location area or a routing area in 3G/UNITS, and is composed of one or a plurality of cells. In each of these cells, an identifier of the tracking area to which the cell in quest on belongs is broadcasted. The mobile station in an idle mode has its location registered in the tracking area in which the UE resides, and stores the identifier of the tracking area in which the UE has its location currently registered. When moving from one cell to another, the UE receives the identifier of the tracking area which is broadcasted. In case the identifier of the tracking area being broadcasted differs from the identifier of the tracking area, currently registered therein, the UE updates location registration. A request for update of this location registration is termed a 'TAU Request'.

In a step S2 of FIG. 10, the MME 1 newly assigns the location registration area information (TA List) to the UE1.

In a step S3 of FIG. 10, the MME 1 informs the S-GW1 about the TA List of the UE1 via S11 interface. The S-GW1 stores the TA List, informed from the MME 1, in a storage unit (memory) in the S-GW1, as the registration information of the UE1.

It is noted that the location registration operation in the steps 1 and 2 of FIG. 10 is known per se and is not directly relevant to the subject-matter of the present invention. Hence, the operation is not explained in detail.

<Second Stage>

Figure 11:
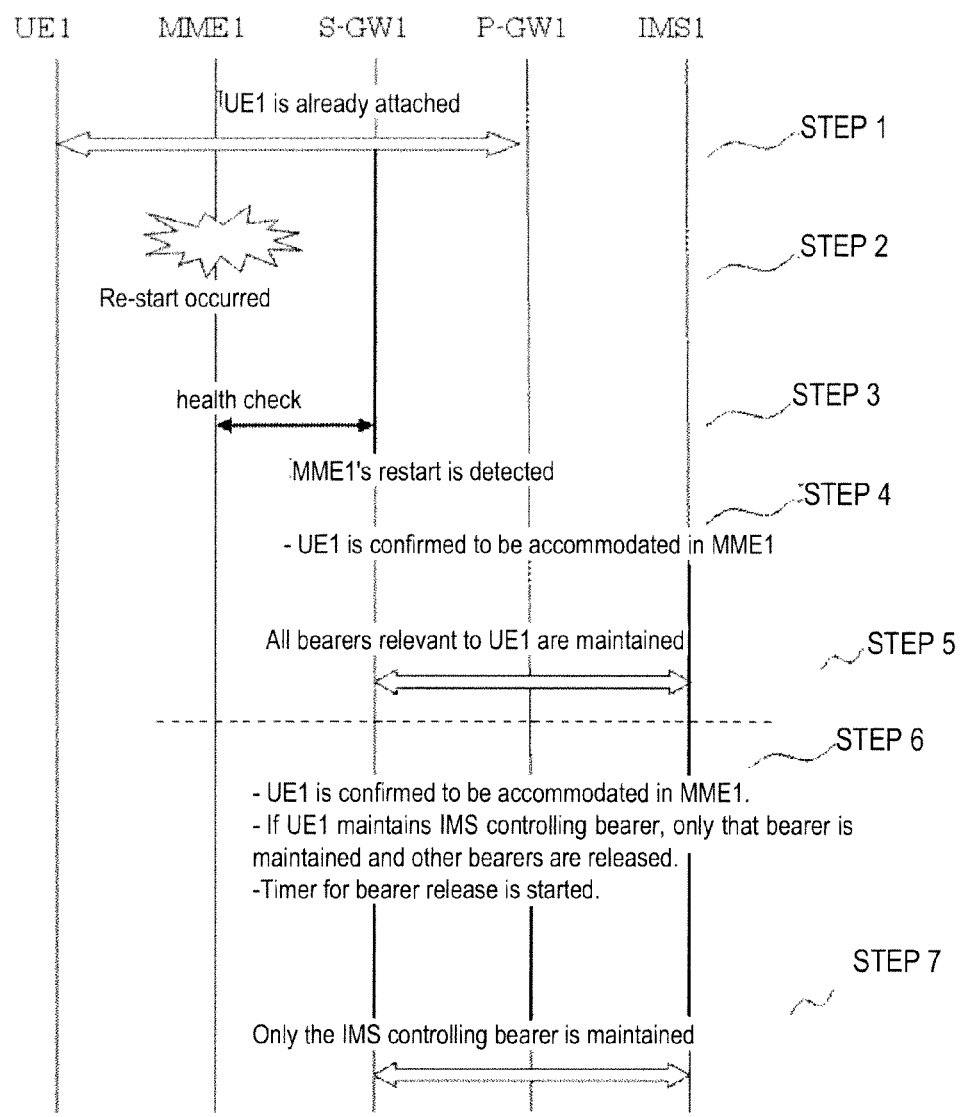
FIG. 11 is a diagram for illustrating another example sequence of the exemplary embodiment 1 of the present invention.

FIG. 11 is a sequence diagram for illustrating, as a second stage, the stage of maintaining a bearer. In a step 1 of FIG. 11, the UE1 has already attached to the MME1 (an attach request has already been issued). A variety of bearers have already been set up using S-GW1 and P-GW1.

In a step 2 of FIG. 11, the restarting of the MME1 occurs and in this MME1, the registration information of the UE1, already attached. is erased.

In a step 3 of FIG. 11, the S-GW1 detects the restarting of the MME1, from processing such as a health check by GTP Echo processing.

In a step 4 of FIG. 11, S-GW1 recognizes all mobile stations UE attached to the MME 1 (it is confirmed that the UE1 is accommodated in the MME 1).

In case the present invention is provided for the entirety of the services, all bearers related with the UE1 from the S-GW1 towards the external network IMS 1 are maintained in the step S5 of FIG. 11.

In steps 6 and 7 of FIG. 11, in distinction from the step S5 of FIG. 11, the bearer maintaining function according to the present invention is not provided for all services relating to the UE1, such that bearers (bearers used for IMS signaling) are maintained for specific services (IMS services providing e.g., voice services).

After confirming in the step S4 of FIG. 11 that the UE1 has been accommodated in the MME 1, the S-GW1 further confirms, in the step 6 of FIG. 11, whether or not there is a bearer(s) providing the IMS (bearer(s) used for IMS signaling) among the bearers owned by the UE1. In verifying the bearers used for IMS control in this manner, a QCI (QoS Class Identifier) value, which is among information elements that each bearer has, may be used. If, in using the QCI value, it is '5', for example, the bearer may be concluded to be the bearer(s) used for IMS signaling (IMS Signaling), in accordance with the Table 6.1.7 of Non-Patent Document 1 (3GPP TS23.03). The bearer may then be concluded to be a control bearer used for rendering voice services.

If there is the control bearer(s) used for IMS signaling among the bearers relating to the UE1 managed by the S-GW1, only the relevant bearer(s) are maintained. The remaining bearers are locally released in accordance with the operation in accordance with Non-Patent Document 2 (3GPP TS23.007).

In case of maintaining the bearers used for IMS signaling (specific bearers), the S-GW1 starts the operation of a timer to release (remove) relevant bearer resources on timeout, in consideration of a case where the UE1 has already re-attached to another S-GW. This timer controls a time of maintaining the above mentioned specific bearer by the S-GW1, and becomes necessary to prevent failing to release the bearers that the S-GW1 maintains. If, in the above timer, the time equivalent to the time of a periodic location registration timer owned by the UE1 is set, the S-GW1 may wait for incoming of voice services for a necessary minimum time interval corresponding to the time of the next periodic location registration request from the UE1. At this time, the fact that the UE1 has not been registered in the MME 1 is stored in the storage unit (memory) of the S-GW1.

In a step 7 of FIG. 11, the UE1 is not registered in the MME and only the IMS control bearer is maintained in the S-GW1 and in the P-GW1. This completes the second stage.

Figure 12:
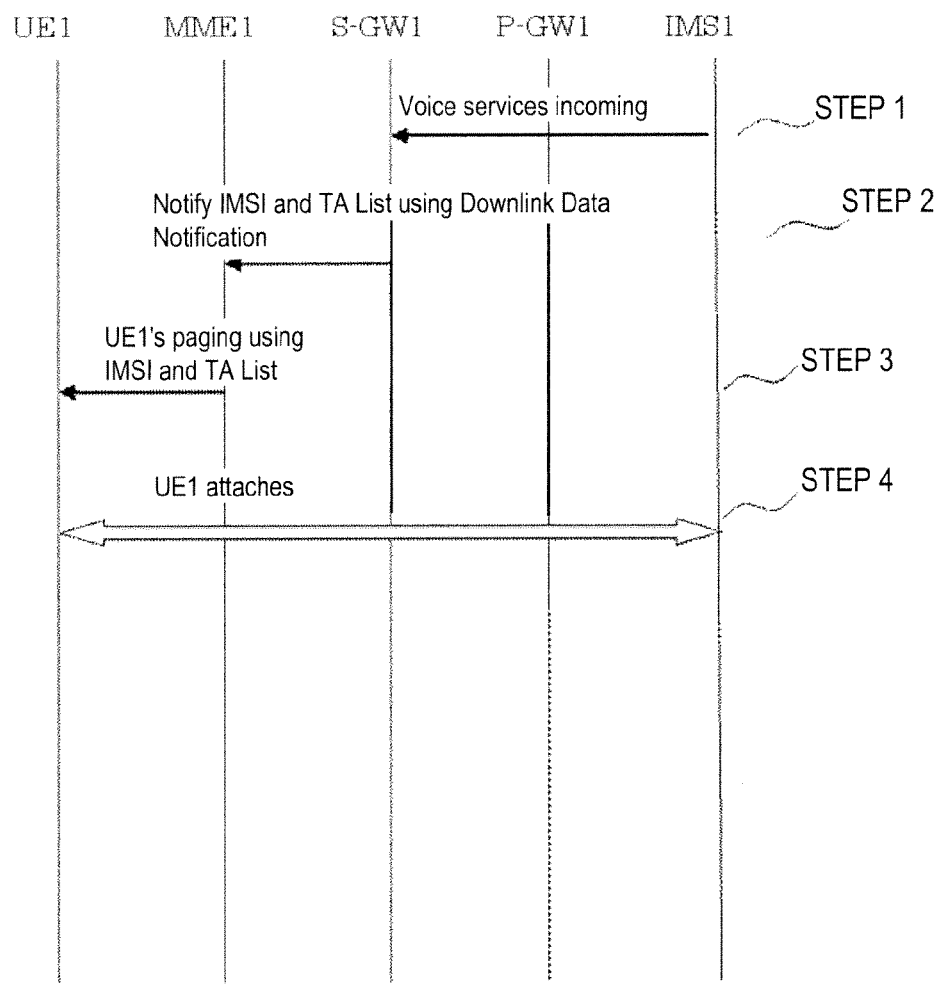
FIG. 12 a diagram for illustrating yet another example sequence of the exemplary embodiment 1 of the present invention.

If the third stage, shown in FIG. 12, has not been carried out thereafter, the S-GW1 removes the entirety of bearers (IMS control bearer resources) that the S-GW1 maintains in connection with the UE1, on timeout of the timer whose operation was started at the step S6 of FIG. 11.
<Third Stage>
FIG. 12 is a sequence diagram showing the operation of a third stage in case a signal has arrived in the second stage from the PDN such as IMS. The following describes respective stages.

In a step 1 of FIG. 12, a notification from the IMS1, indicating the incoming of voice services to the UE1, arrives at the G-SW1.

In a step S2 of FIG. 12, the G-SW1 stores the information that the UE1 is in an unregistered state due to the restarting of the MME1. Hence, the G-SW1 sends a downlink data notification (Downlink Data Notification), inclusive of the IMSI and the previously registered TA List, to the MME1, to inform the incoming of voice services (packet data).

If, in a step S3 of FIG. 12, the UE1, having the IMSI that has been notified, is not attached, the MM1 performs paging of the UE1 for the received TA List, using the IMSI. However, there is such a case wherein, in carrying out the step S3, the UE1 has already selected another S-GW and has attached to the MME1. In this case, to prompt the S-GW1 to release the entirety of the bearers relevant to the UE1, the MME1 returns a downlink data notification acknowledge (Downlink Data Notification Acknowledge) response indicating the cause that the UE1 has already re-attached.

In a step 4 of FIG. 12, the UE1 performs the attachment operation on receipt of the paging employing the IMSI.

The attach operation of the UE in the step 4 of FIG. 12 is well-known to those skilled in the art and, not directly relevant to the present invention. Hence, explanation of the detailed configuration is dispensed with.

Figure 7:
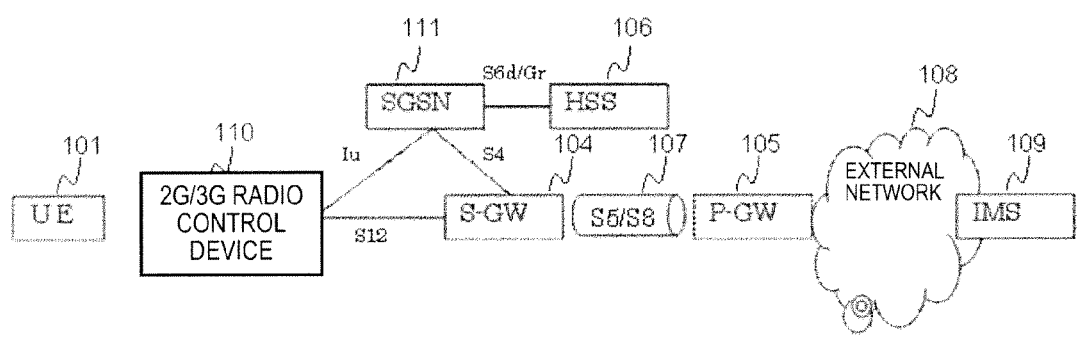
FIG. 7 is a diagram for illustrating a packet communication network that accommodates 2G/3G.

When the S-GW detects the restarting of the MME, if the tunnel (GTP-U) on the S1-U interface between the eNodeB and the S-GW is active, the S-GW releases the tunnel.
<Exemplary Embodiment 2>
As an exemplary embodiment 2 of the present invention, the following describes the operation at the time of SGSN restarting in the network configuration of FIG. 7. Basically, the operation of the exemplary embodiment 2 is equivalent to the operation at the time of restarting of MME in the exemplary embodiment 1. In the example of FIG. 7, 2G/3G is accommodated. Specifically, the eNodeB 102 and the MME 103 of FIG. 6 are replaced by a 2G/3G radio control apparatus (nodeB and RNC) 110 and an SGSN 111. An interface between the 2G/3G radio control apparatus (NodeB and RNC) 110 and the SGSN 111 is Iu, an interface between the 2G/3G radio control apparatus (NodeB and RNC) 110 and the S-GW 104 is S12, an interface between the SGSN and the S-GW is S4 and an interface between the SGSN 111 and the HSS 106 is an S6d/Gr.

Figure 13:
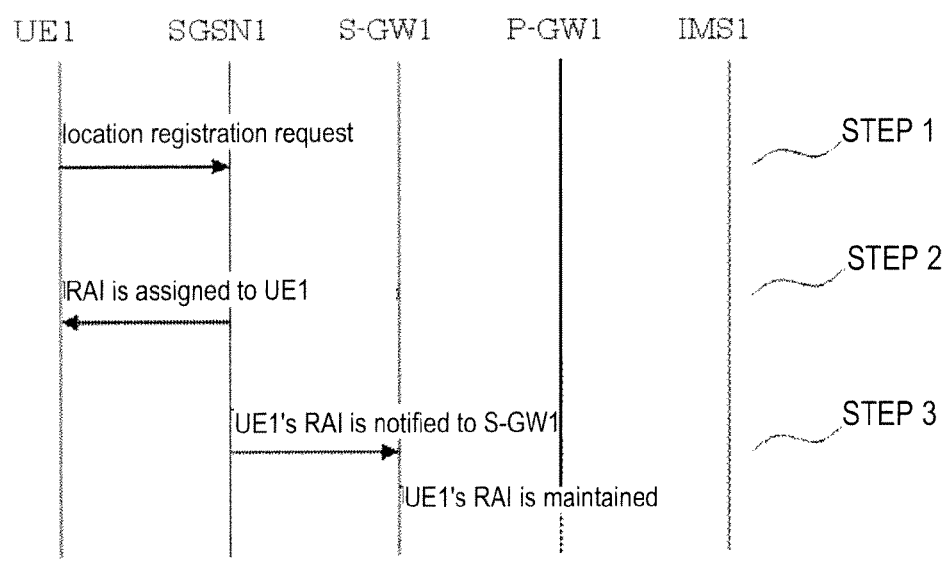
FIG. 13 is a diagram for illustrating an example operating sequence of an exemplary embodiment 2 of the present invention.

The operation of the present exemplary embodiment may be summarized to have three separate stages.
<First Stage>
FIG. 13 is a sequence diagram showing a stage of registering the location registration area information of the UE in the S-GW1, as a first stage. The following describes respective steps.

In a step S1 of FIG. 13, the UE1 sends a location registration request (Attach Request/Routing Area Update Request) to the SGSN1. The Routing Area Update Request is a location registration update request to the SGSN.

In a step S2 of FIG. 13, the SGSN1 newly assigns the location registration area information (RAI) to the UE1.

In a step 3 of FIG. 12, the SGSN1 notifies the S-GW1 of the RAI of the UE1. The S-GW1 maintains the RAI notified as the registration information of the UE1.

The location registration operation of FIG. 12 is known per se among those skilled in the art and is not directly relevant to the subject-matter of the present invention. Hence, the operation is not explained in detail, <Second Stage>

Figure 14:
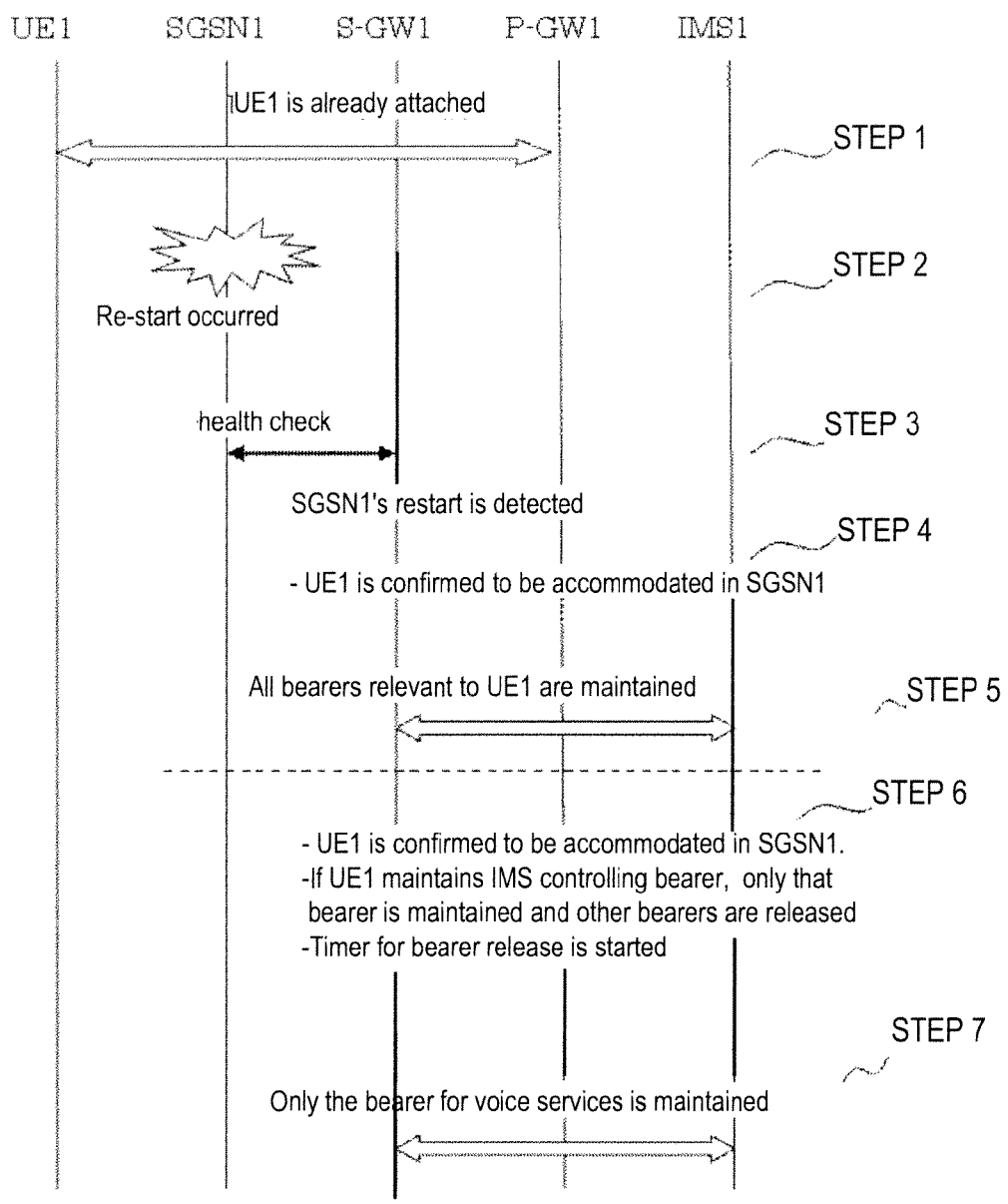
FIG. 14 is a diagram for illustrating another ex ample operating sequence of the exemplary embodiment 2 of the present invention.

FIG. 14 is a sequence diagram for the stage of maintaining a bearer, as a second stage. The following describes respective steps.

In a step S1 of FIG. 14, the UE1 has already attached to the SGSN1, and a various types of bearers have been set up using the S-GW1 and P-GW1.

In a step 2 of FIG. 14, the processing of restarting occurs in the SGSN1. The registration information of the UE1 attached is erased.

In a step 3 of FIG. 14, the S-GW1 detects the restarting at SGSN1 by processing, such as a health check, by GTP Echo processing.

In a step S4 of FIG. 14, the S-GW1 recognizes the entirety of the mobile stations UE (it is confirmed that the UE1 is accommodated in SGSN1).

In case the present invention is applied to the entirety of services, all bearers are maintained in a step 5 of FIG. 14.

In steps 6 and 7 of FIG. 14, bearers are not maintained for the entirety of the services, as is done in the step 5 of FIG. 11. Instead, just a bearer relating to a specific service (IMS service, providing e.g., voice services, in the following example) is maintained.

After step S4 of FIG. 14 of confirming that the UE1 is accommodated in SGSN1, the S-GW1 confirms, in a step 6 of FIG. 14, whether or not there is the IMS signaling bearer among the hearers held by the UE1. The IMS signaling bearer is a bearer used for IMS signaling. In determining whether or not a bearer in question is the IMS signaling bearer, the value of a QCI (QoS Class Identifier), which is one of the control elements owned by each bearer, for example, may be used. If the QoS value is '5', for example, a bearer in question is determined to be the bearer for IMS signaling (IMS signaling) in accordance with Table 6.1.7 of Non-Patent Document 1 (3PP TS23.203). The bearer in question may thus be determined to be a control bearer used for providing voice services. If there is such IMS signaling bearer, the S-GW1 maintains just such bearer, and locally releases (removes) other bearers in accordance with the operation of Non-Patent Document 1 (3GPP TS23.007).

In case the IMS signaling bearer is maintained, the operation of a timer, which on timeout releases the bearer, is started in order to take account of the case where the UE1 has already attached to another S-GW1. This timer is necessary to prevent failing to release bearers that the S-GW1 maintains.

In case, in the above timer, the time equivalent to the time of a periodic location registration timer included in the UE1 is set, the S-GW1 may wait for incoming of voice services for a necessary minimum time corresponding to the time of the next periodic location registration request from the UE1. At this time, the fact that the UE1 has not been registered in the SGSN1 is stored in the S-GW1.

In a step S7 of FIG. 14, the SGSN1 is in such a state that the UE1 has not been registered and that only the IMS control bearer is maintained in the S-GW1 and in the P-GW1.

Figure 15:
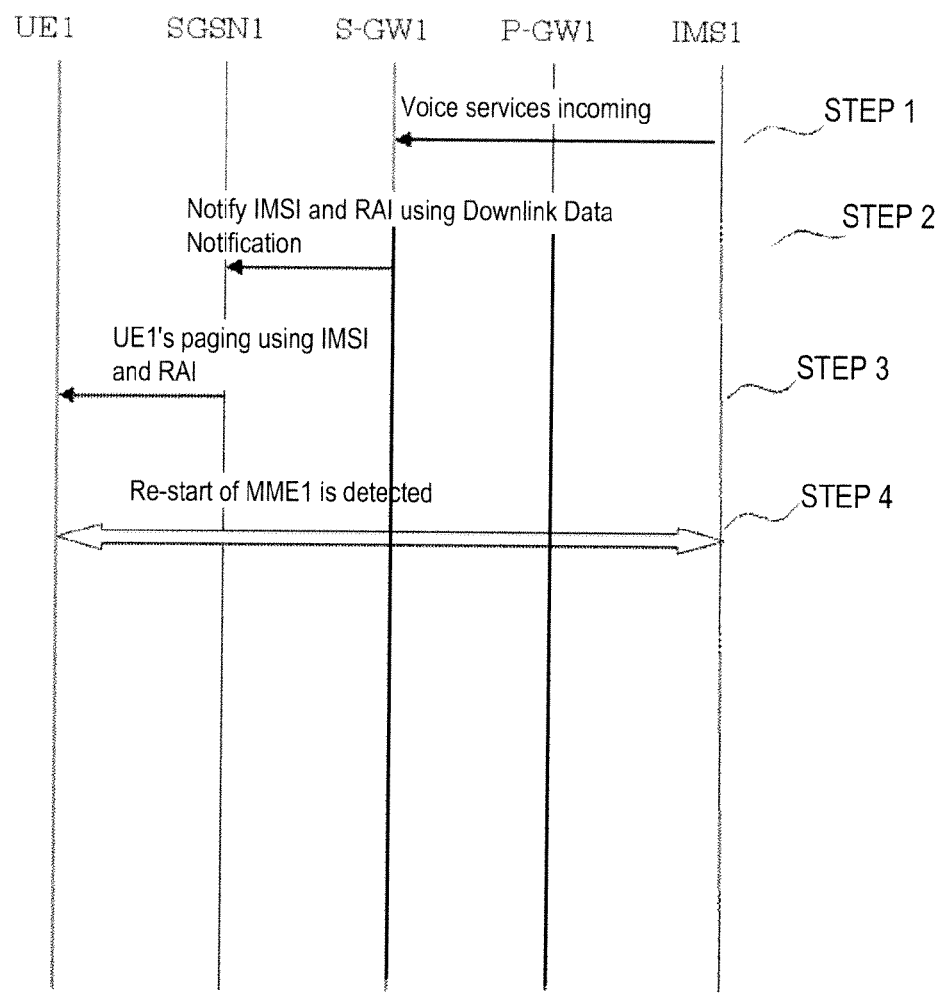
FIG. 15 is a diagram for illustrating yet another example operating sequence of the exemplary embodiment 2 of the present invention.

In case thereafter the third stage shown in FIG. 15 is not executed, the S-GW1 removes the entirety of the bearers maintained in connection with the UE1 (IMS control bearer resources) at a timeout time point of the timer whose operation started in the step 6 of FIG. 14.

<Third Stage>

FIG. 5 is a sequence diagram for illustrating the operation of a third stage in case of an incoming from PDN, such as IMS.

In a step S1 of FIG. 5, incoming notification of voice services from IMSI to the UE1 gets to the S-GW1.

In a step S2 of FIG. 15, the S-GW1 sends the IMSI and the downlink data notification (Downlink Data Notification) inclusive of IMSI and RAI that have been registered in advance to the MME to inform the incoming of voice services (packet data). It is because the S-GW1 stores that the UE1 is in a non-registered state because of restarting of the SGSN1.

In case the UE1 that has the notified IMSI, has not attached, the SGSN1 in a step S3 in FIG. 15 performs paging of the UE1, for RAI received, using the IMSI. However, there is such a case wherein, in carrying out the step S3 of FIG. 15, the UE1 has already selected another S-GW and has attached to the SGSN1. In this case, to prompt the S-GW1 to release the entirety of the bearers relevant to the UE1, the SGSN1 sends back to the S-GW1 a downlink data notification acknowledge (Downlink Data Notification Acknowledge) response indicating the cause that the UE1 has already re-attached.

In a step 4 of FIG. 15, the UE1 that has received the paging employing the IMSI performs an attachment operation. The attachment operation of the UE of the step S4 of FIG. 15 is known per se among those skilled in the art and is not directly relevant to the subject-matter of the present invention. Hence, its detailed configuration is omitted.

<Exemplary Embodiment 3>

Figure 8:
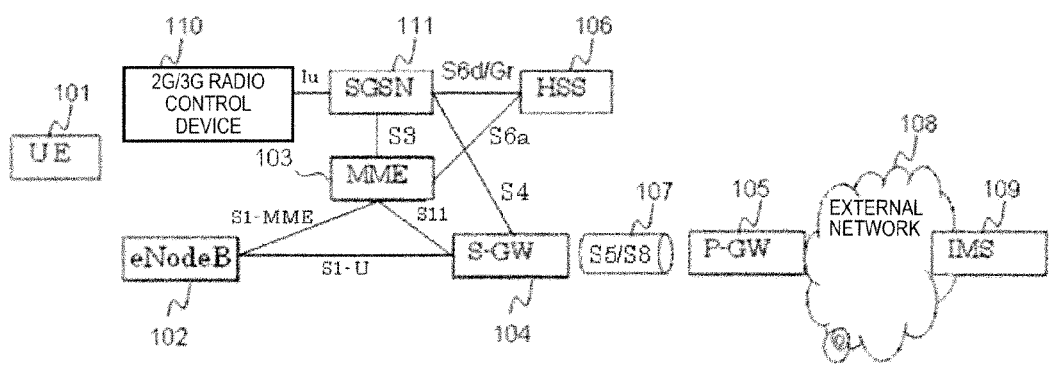
FIG. 8 is a diagram for illustrating a packet communication network that accommodates LTE and 2G/3G.

As an exemplary embodiment 3 of the present invention, the following describes the operation in case of employing an ISR function (LTE/3G location registration omitting function) under the network configuration of FIG. 8. In ISR, the UE registers its location in both the MME and the SGSN. In case of switching a radio access system between LTE and 2G/3G, UE location registration is omitted as long as there is no change in the previously registered location registration area in LTE and that in 2G/3G. FIG. 8 shows a packet communication network configuration accommodating LTE and 2G/3G. This configuration corresponds to the configuration of FIG. 1 added by a 2G/3G radio control apparatus 110 and an SGSN 111 to be connected to the UE 101. The MME 103 is connected to the SGSN 111 via an S3 interface, while the MME 103 and the SGSN 111 are connected to the HSS 106 via an S6a interface and an S6d/Gr interface. The S-GW 104 is connected to the SGSN 111 and to the MME 103 via an S4 interface and via an S11 interface.

<First Stage>

The processing of location registration for the UE1 from 2G/3G, as a first stage, is shown in FIG. 3. FIG. 10 may apply as regards the processing of location registration from LTE. By these two operations, the S-GW1 maintains RAI and TA List as the location registration area information. The processing of location registration during the ISR operation is known per se among those skilled in the art and is not directly relevant to the subject-matter of the present invention. Hence, its detailed configuration is omitted.

<Second Stage>

Figure 16:
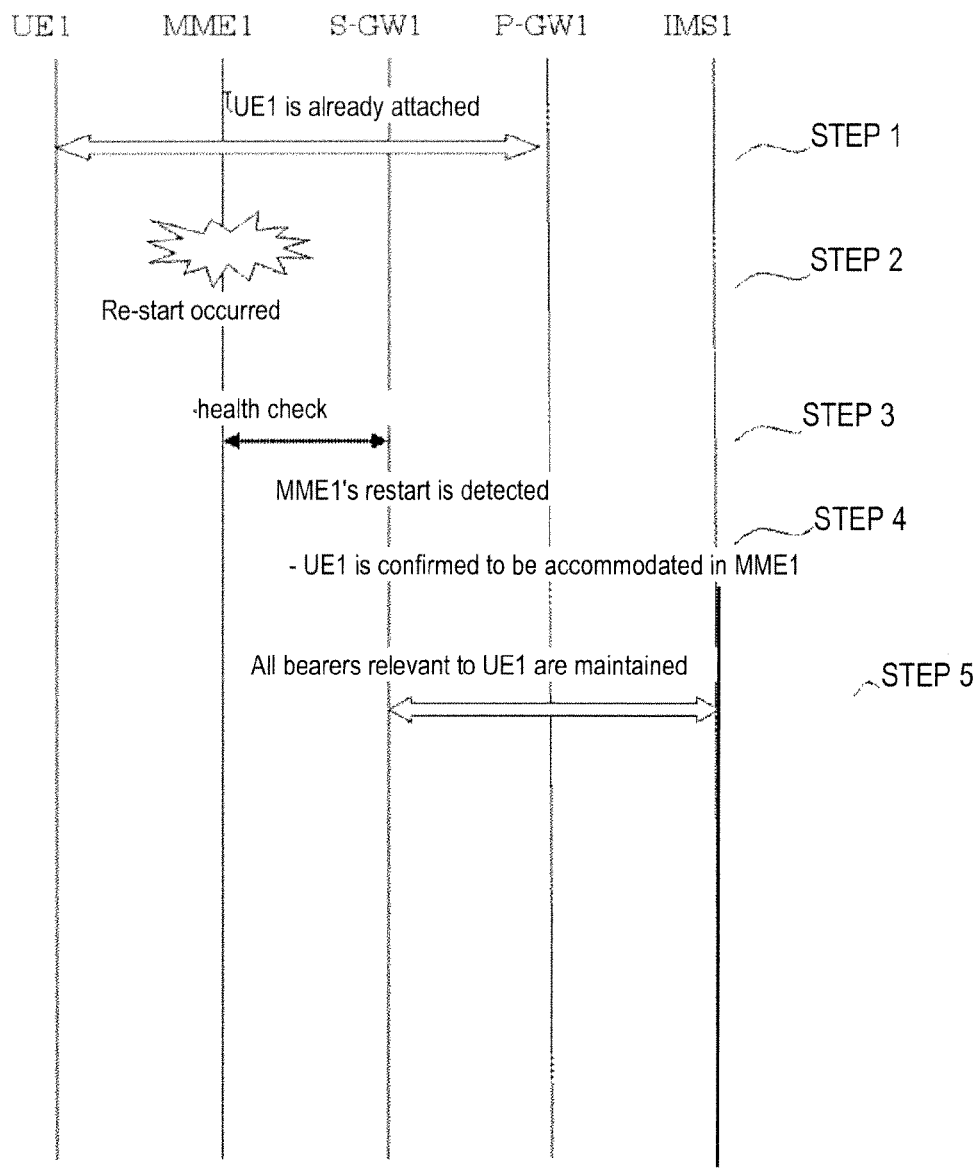
FIG. 16 is a diagram for illustrating an example operating sequence of an exemplary embodiment 3 of the present invention.
Figure 17:
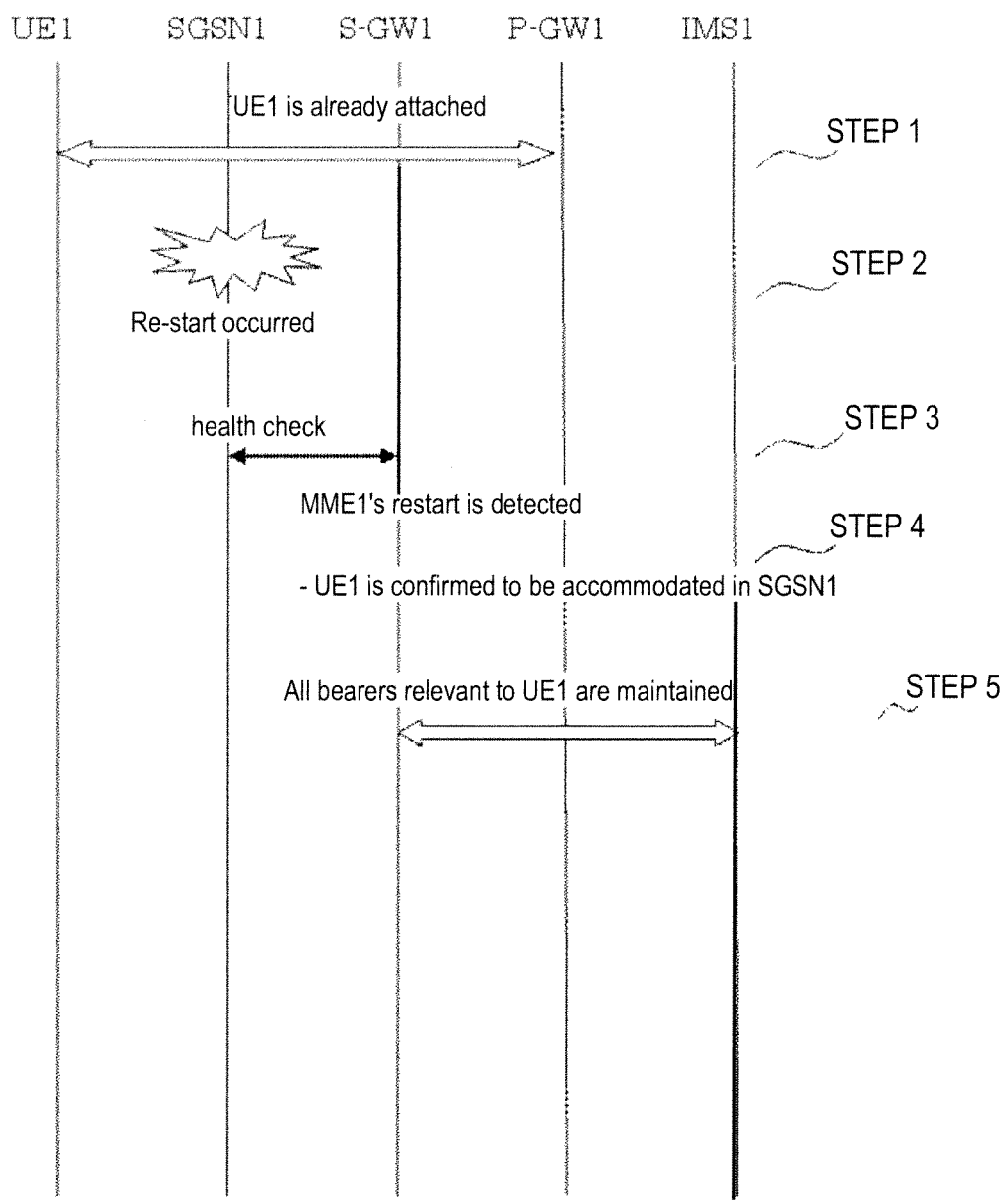
FIG. 17 is a diagram for illustrating another example operating sequence of the exemplary embodiment 3 of the present invention.

FIG. 16 is an example of a sequence as an operation in case of restarting of the MME1 of FIG. 8. FIG. 17 shows an example of a sequence as an operation in case of restarting of the SGSN1 of FIG. 8

In a step 1 of FIG. 16, the UE1 has its location registered in the MME1, and a various types of hearers have been established using the S-GW1 and the PGW1.

In a step 2 of FIG. 16, restarting occurs in the MME1, so that the registration information of the UE1 in the MME1 is erased.

In a step 3 of FIG. 16, the S-GW1 detects the restarting of the MME1 from processing, such as a health check by the GTP Echo processing.

In a step 4 of FIG. 16, the S-GW1 does not perform releasing of bearers because the S-GW1 knows that the UE1 attached to the MME1 has been registered using the SGSN1 and the ISR function. At this time, the fact that the UE1 is not registered in the MME1 is stored in an internal memory of the S-GW1. However, in case the SGSN1 has already been restarted, the processing according to the present invention (processing of maintaining the bearer relevant to the UE1) is carried out as is the processing of FIG. 11.

The following describes the operation in case the SGSN1 of FIG. 8 has restarted.

In a step 1 of FIG. 17, the UE1 has its location registered in SGSN1, and a various types of bearers have already been set up using the S-GW1 and the P-GW1.

In a step 3 of FIG. 17, the processing of restarting, for example, occurs in the SGSN1, and the registration information of the UE1, which has its location registered, is erased.

In a step 3 of FIG. 17, the S-GW1 detects the restarting of the SGSN1 from processing such as a health check the by GTP Echo processing.

In a step 4 of FIG. 7, the S-GW1 does not perform bearer releasing because the S-GW1 knows that the UE1 attached to the MME1 has been registered using the MME1 and the ISR function. The non-registration status of the UE1 in the SGSN1 is stored in the internal memory of the S-GW1. However, if the MME1 has already restarted, the processing according to the present invention (processing of maintaining the bearer relevant to the UE1) is carried out as with the processing of FIG. 14.

<Third Stage>

Figure 18:
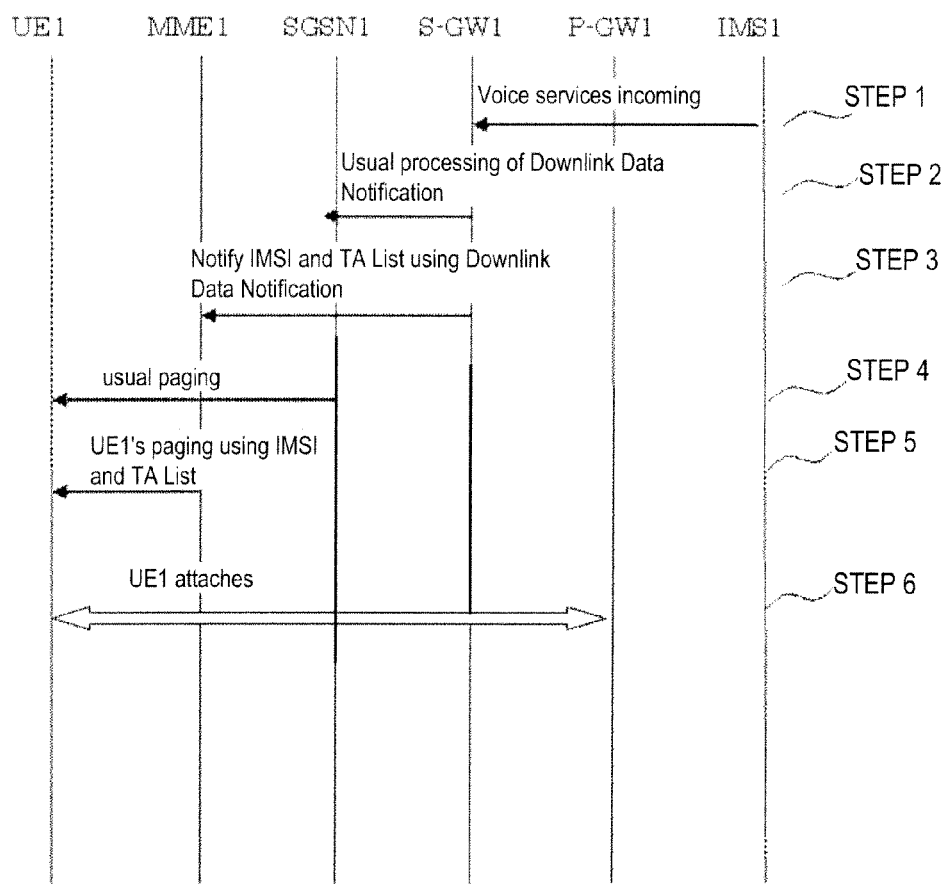
FIG. 18 is a diagram for illustrating an example operating sequence of an exemplary embodiment 4 of the present invention.
Figure 19:
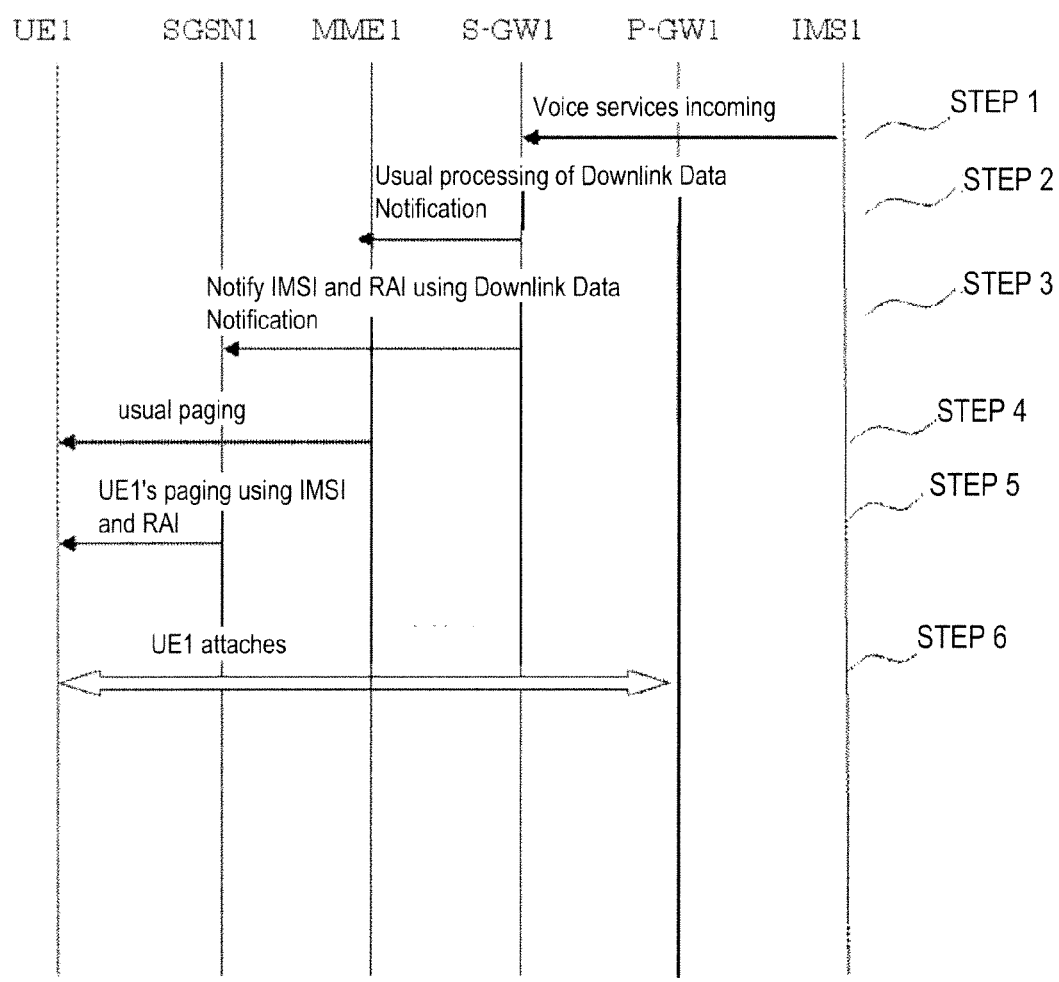
FIG. 19 is a diagram for illustrating another example operating sequence of the exemplary embodiment 4 of the present invention.
Figure 20:
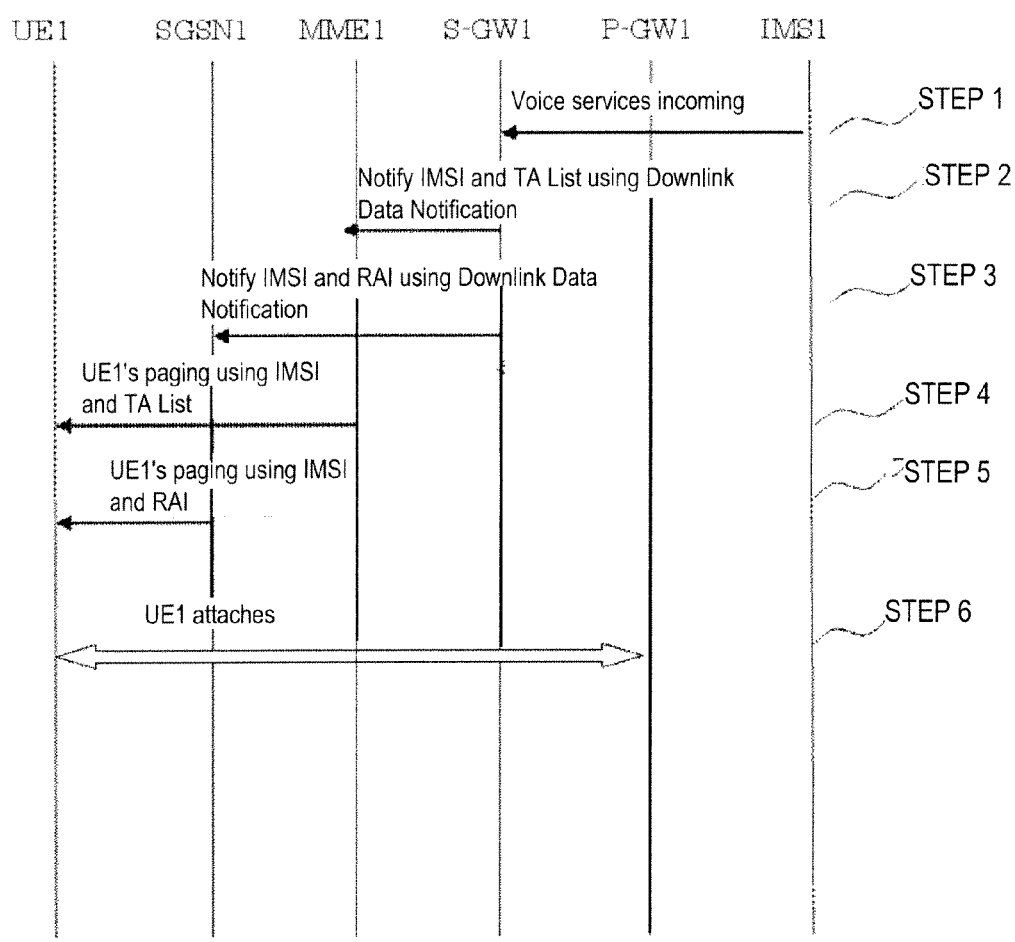
FIG. 20 is a diagram for illustrating yet another example operating sequence of the exemplary embodiment 4 of the present invention.

FIG. 18 is a diagram showing an example of a sequence of the operation in case there is an incoming from the PDN under a condition that the MME1 of FIG. 8 has restarted, as a third stage. FIG. 19 is a diagram showing an example of a sequence of the operation in case there is an incoming from the PDN under a condition that the SGSN1 of FIG. 8 is restarted. FIG. 20 is a diagram showing an example of a sequence of the operation in case there is the incoming from the PDN under a condition that both the MME1 and the SGS1 of FIG. 8 are restarted.

In case there is an incoming from the PDN under a condition the MME1 of FIG. 8 is restarted, incoming notification of communication services from the PDN1 to the UE1 gets to the S-GW1 in a step 1 of FIG. 18.

In a step 2 of FIG. 18, the S-GW1 sends a normal downlink data notification (Downlink Data Notification) to the SGSN1 to inform the arrival of the incoming of voice services (packet data).

In a step 3 of FIG. 18, the S-GW1 sends a downlink data notification (Downlink Data Notification), inclusive of the IMSI and the pre-registered TA List, to the MME1 to inform the incoming of voice services (packet data). It is because the S-GW1 stores the non-registered state of the UE1 on account of the restarting of the MME1.

In a step 4 of FIG. 18, the SGSN1 performs normal paging (paging of the mobile station responsive to the incoming).

In a step 5 of FIG. 18, in case the UE1 having the IMS1 according to the notification is not attached, the MME1 performs paging of the UE1, using the IMSI, by referring to the TA List received.

In a step 6 of FIG. 18, paging employing the IMSI is received at LTE, the UE1 performs an attachment operation.

The following describes a case wherein an incoming from the PDN is performed under a condition the SGSN has restarted.

In a step 1 of FIG. 19, incoming notification of communication services from the PDN1 to the UE1 gets to the S-GW1.

In a step 2 of FIG. 19, the S-GW1 sends a normal downlink data notification (Downlink Data Notification) to the MME1 to inform the incoming of voice services (packet data).

In a step 3 of FIG. 19, the S-GW1 sends a downlink data notification (Downlink Data Notification), inclusive of the IMSI and the pre-registered RAI, to the SGSM1, to inform the incoming of voice services (packet data). It is because the S-GW1 stores the non-registered state of the UE1 on account of the restarting of the MME1.

In a step 4 of FIG. 18, the SGSN1 performs normal paging.

In a step 5 of FIG. 18, in case the UE1 having the IMSI according to the notification has not attached, the SGSM1 performs the paging of the UE1, using the IMSI, by referring to the RAI received.

In a step 6 of FIG. 19, in case the paging employing the IMSI is received in 2G/3G. the UE1 performs an attachment operation.

The following describes a case wherein an incoming from the PDN is performed under a condition both the MME and the SGSN have restarted.

In a step 1 of FIG. 20, incoming notification of communication services from the PDN1 to the UE1 gets to the S-GW1.

In a step 2 of FIG. 20, the S-GW1 sends a downlink data notification (Downlink Data Notification), inclusive of the IMSI and the pre-registered TA List, to the MME1 to inform the incoming of voice services (packet data). It is because the S-GW1 stores the non-registered state of the UE1 on account of the restarting of the MME1.

In a step 3 of FIG. 20, the S-GW1 sends a downlink data notification, inclusive of the IMSI and the pre-registered TA List, to the SGSN1, to inform the incoming of voice services (packet data). It is because the S-GW1 stores the non-registered state of the UE1 which is due to the restarting of the MME1.

In a step 4 of FIG. 20, in case the UE1 having the IMSI according to the notification is not attached, the MME1 performs paging of the UE1, using the IMSI, by referring to the TA List received.

In a step 5 of FIG. 20, in case the UE1 having the IMSI according to the notification is not attached, the SGSN1 performs paging of the UE1, using the IMSI, by referring to the RAI received.

In a step 6 of FIG. 20, when receiving the paging employing the IMSI, the UE1 performs an attachment operation.

The attachment operation of the UE of the step S6 of FIGS. 11, 12 and 13 is known per se among those skilled in the art and is not directly relevant to the subject-matter of the present invention. Hence, the detail configuration is omitted.

<Exemplary Embodiment 4>

Figure 9:
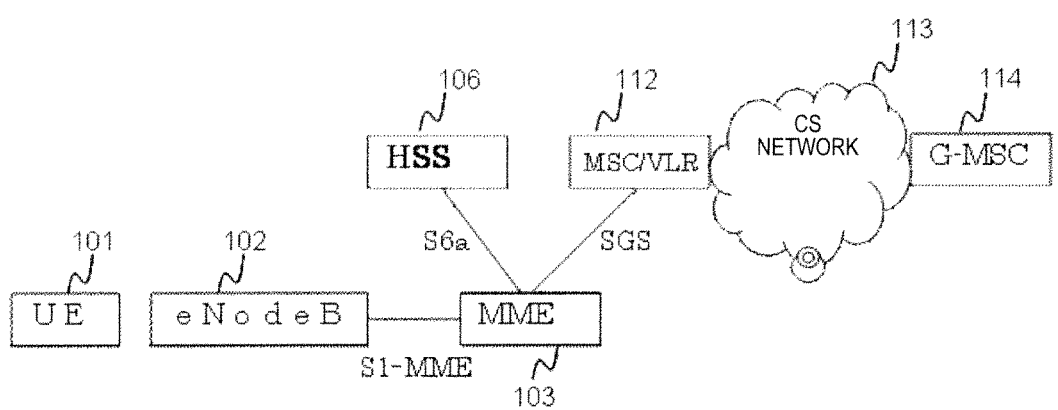
FIG. 9 is a diagram for illustrating CSFB (Circuit Switch Fall Back).

FIG. 9 is a diagram showing a network configuration according to a fourth exemplary embodiment according to the present invention. In FIG. 9, there is shown a CSFB (CS Fallback) architecture. Referring to FIG. 9, the network includes the UE 101, a base station (eNodeB) 102, an MME 103, an HSS 106, an MSC/VLR 112, a CS network 113 and a G-MSC (gateway mobile switch center) 114. The following describes the operation of voice incoming from the G-MSC 114 as an originating source to the UE 101 with reference to FIG. 9.

A signal notifying the incoming is sent from the G-MSC 114 as an originating source to the MSC/VLR 112 via the CS network 113. The MSC/VLR 112 identifies the corresponding MME 103 from the incoming information to send a paging request message (Paging-Request-Message) to the MME 103. The MME 103 sends a paging signal to the UEs that reside in the serving area. This paging signal includes information indicating that the paging is for CS services. The UE 101 recognizes this information, that is, the information that the paging is that for CS services, and sends a CS service request signal to the MME 103. The MME 103 sends a handover command to the UE1. The UE 101 performs handover, while switching to 3G. The UE 101, which has switched to 3G, sends a paging response to the MSC/VLR 112, as a result of which the voice services at the mobile station to the incoming voice are started. The following describes the operation when the MME restarts.

The operation according to the present invention may be summarized to have three separate stages.

<First Stage>

Figure 21:
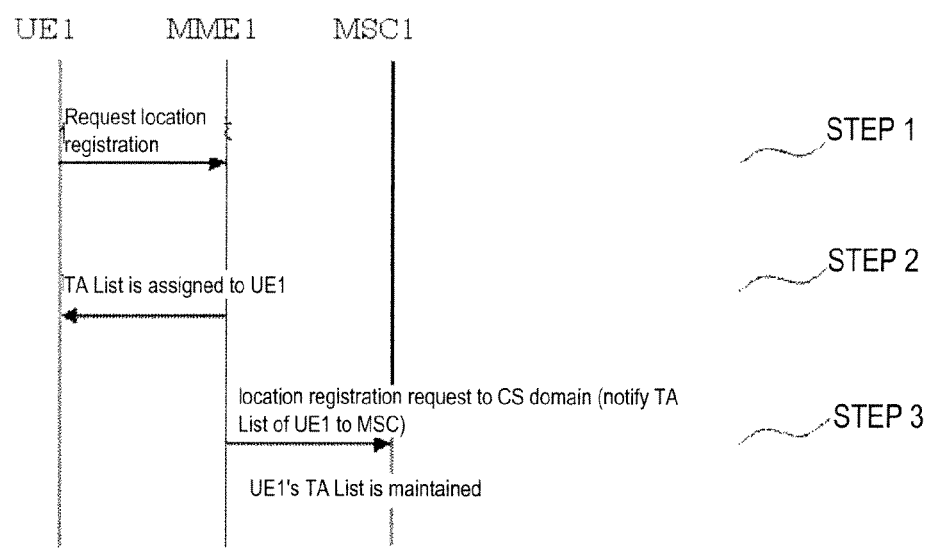
FIG. 21 is a diagram for illustrating an example operating sequence of an exemplary embodiment 5 of the present invention.

FIG. 21 is a sequence diagram showing, as a first stage, the stage of registering location registration area information of the UE. The following describes respective steps.

In a step 1 of FIG. 21, the UE1 makes a location registration request for CSFB (Attach Request, TAU Request and so forth) to the MME1.

In a step 2 of FIG. 21, the MME1 newly assigns (delivers) the location registration area information (TA List) to the UE1.

In a step 3 of FIG. 21, the MME1 notifies the MSC1 of the TAU List of the UE1. The MSC1 maintains the TAU List, notified from the MME1, as the registration information of the UE1.

The location registration operation of FIG. 21 is known per se among those skilled in the art and is not directly relevant to the subject-matter of the present invention. Hence, the detailed configuration is omitted.

<Second Stage>

Figure 22:
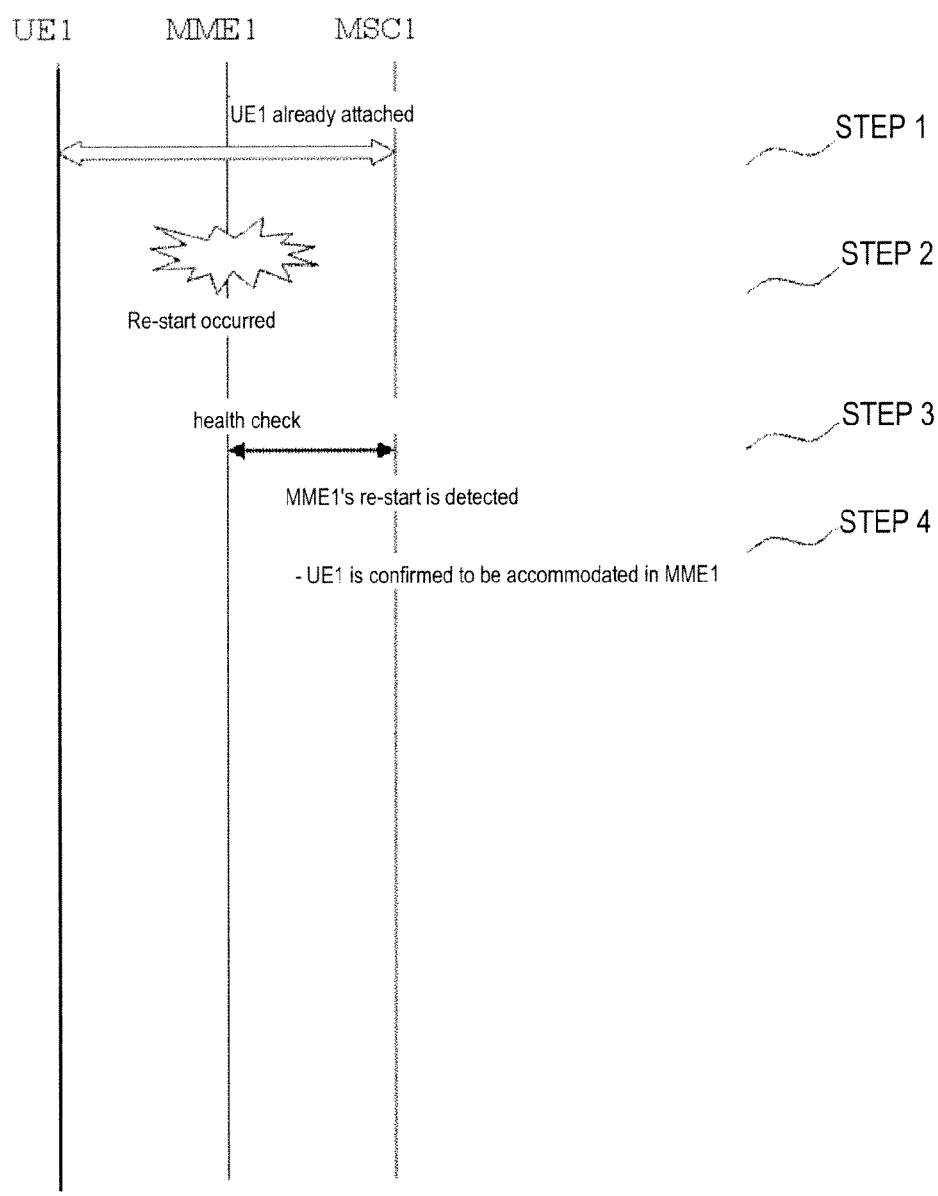
FIG. 22 is a diagram for illustrating another example operating sequence of the exemplary embodiment 5 of the present invention.

FIG. 22 is a sequence diagram showing, as a second stage, the stage of maintaining a bearer. The following describes respective steps.

In a step 1 of FIG. 22, the UE1 has already attached to the MME1.

In a step 2 of FIG. 22, restarting occurs in the MME1 and the registration information of the UE1 is erased.

In a step 3 of FIG. 22, the MSC1 detects the restarting of the MME1 from processing such as a health check by SCTP.

In a step 4 of FIG. 22, the MSC1 recognizes the entirety of the mobile stations UE attached to the MME1 (it is recognized that the UE1 is accommodated in MME1). The above is the second stage.

<Third Stage>

Figure 23:
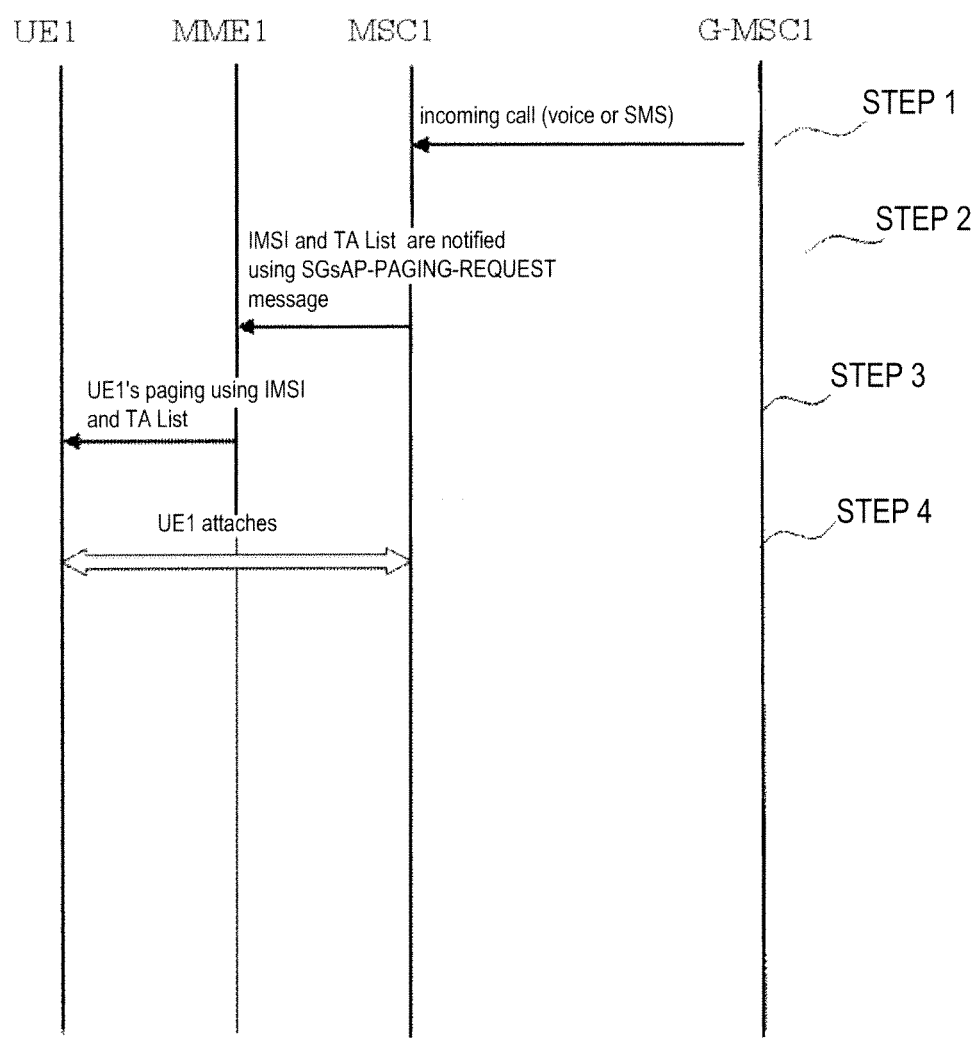
FIG. 23 is a diagram for illustrating yet another example operating sequence of the exemplary embodiment 5 of the present invention.

FIG. 23 depicts an example sequence diagram showing, as a third stage, an operation sequence for the case of incoming (voice incoming or SMS, for example) via a CS domain. The following describes respective steps.

In a step 1 of FIG. 23, an incoming notification to the UE1 arrives at the MSC1 by e.g., the G-MSC.

In a step 2 of FIG. 23, the MSC1 sends a paging request message inclusive of IMSI and pre-registered TA List (SGsAP-PAGING-REQUEST message) to the MME1 to notify the MME1 of the incoming. It is because the MSC1 stores the non-registered state of the UE1 brought about by restarting of the MME1.

In a step 3 of FIG. 23, in case the UE1 having the IMSI notified thereto has not attached, the MME1 performs a paging of the UE1, using the IMS1, for the TA List received.

However, there is such a case wherein, in carrying out the step S3 of FIG. 23, the UE1 has already selected another MSC and has attached to the MME1.

In this case, to prompt the MSC1 to release the entirety of the bearers relevant to the UE1, the MME1 sends back to the MSC1 a paging reject message (SGsAP-PAGING-REJECT message) indicating the cause that the UE1 has already re-attached.

In a step 4 of FIG. 23, the UE1, which has received the paging that uses the IMS1, performs an attachment operation. The attachment operation of the UE in the step 4 of is known per se among those skilled in the art and is not directly relevant to the subject-matter of the present invention. Hence, the configuration is omitted.

In the drawings of the above described exemplary embodiment, only one (P-GW1) is shown as the P-GW for simplicity of explanation. However, a plurality of P-GWs, such as P-GW2, P-GW3 or P-GWN, may be used in a similar manner.

Figure 24:
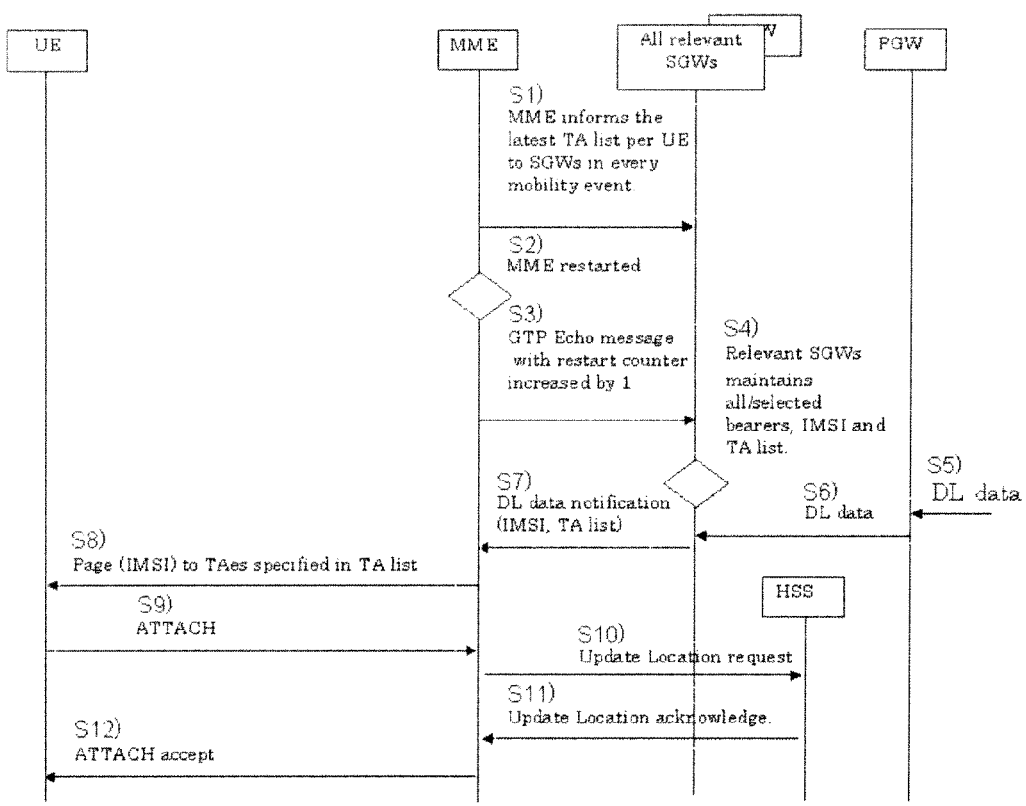
FIG. 24 is a diagram for illustrating an example operating sequence of a mode of the present invention.

Another one of modes of the present invention will now be explained with reference to FIG. 4, which supplements FIG. 10, for example, and shows subscriber data re-installation by network triggered service request. It is noted that the eNodeB is omitted in FIG. 24.

S1) The MME sends the latest TA-list to a relevant S-GW. That is, the MME informs the latest TA-list on a per UE basis to one or more S-GWs in every occurrence of mobility events. This information (TA list) is important in case of MME failure because paging of the IMSI for the coverage of the MME in its entirety may thereby be avoided. Since larger numbers of eNodeBs are accommodated in one MME, the load in the EPS system may become tremendously severe if paging is to be performed for the entire coverage.

S2) The MME performs restarting.

S3) With a restart counter increased by one, a GTP Echo message (GTP-V2 Echo response message) is sent to the entirety of the relevant S-GWs.

S4) The relevant S-GW detects MME failure by this GTP echo mechanism. The S-GW is able to maintain all or selected bearers, IMSI and the TA list. An operator is able to select a bearer based on top-rank services (IMS) (service on top (IMS)), as a result of which the bearer maintained may he selected only for important services. For other (selected) bearers, the current MME restarting mechanism is applied. If the S-GW is to maintain bearer resources, IMSI and the TA list, the S-GW starts a timer that controls a time interval for maintaining bearer resources, for example. On timeout of the timer, the bearer resources maintained are removed. This alternative is needed for such case in which, when the UE re-attaches to a network, the S-GW in question is not selected. That is, on timeout of the timer of the S-GW in question, the above mentioned bearer resources maintained, for example, S5/S8 bearers, which are specific bearers maintained, are removed on the assumption that the UE has re-attached to the network via a S-GW different from the S-GW in question.

S5) DL data arrives at the P-GW from an external network (PDN).

S6) The S-GW acquires the DL data from the P-GW.

S7) The S-GW sends a downlink data notification message inclusive of the IMSI and the TA list (DL data notification (IMSI, TA list)) to the MME.

S8) The MME starts the IMSI page ((Page (IMSI) to TAs specific in TA list) for all of TAs of the TA list received from S-GW.

S9) On receiving the IMSI page, the UE1 starts the attach (ATTACH) procedure.

S10) On receiving the attach (ATTACH) request from the UE, the MME sends a location information update request to the HSS.

S11) The HSS sends location information update acknowledge to the MME.

S12) The MME sends the ATTACH acceptance to the UE via eNodeB.

In case of detecting the restart of the MME, the S-GW maintains the bearer, IMSI or the TA list. In this manner, it is possible to instantaneously recover communication services after restart of the MME and after arrival of the DL data at the UE from the PDN side.

In a mode of the present invention, in case only the selected bearer is to be maintained, it is possible to suppress consumption of S-GW resources. In addition, by selecting and maintaining bearers for important services, communication services may instantaneously be restored for services of higher rank of importance, such as voice communication, on arrival of an incoming to the mobile station, after the restarting of the MME.

In another mode of the present invention, in case a bearer is to be maintained by itself or together with the IMSI and the TA list, the time interval of the maintenance is managed by a timer. On timeout of the timer, the bearer, IMSI and the TA list maintained are released. By so doing, in case, after restart of the MME, the mobile station moves and attaches to a G-SW different from the S-GW that maintains the bearer, it is possible to prevent the S-GW that maintains the bearer from maintaining the bearer longer than is necessary.

According to the present invention, described above, the following effects may be realized.

UE's communication services may be improved in availability by adding packet incoming as a re-registration trigger of a UE registered in the MME/SGSN in which restarting occurred.

In case the present invention is applied to all services, incoming of the entirety of the packets may be used as a trigger for restoring the UE to the network. It may however be thought that ma y resources on the S-GW side are used, and that location registration events may become concentrated. The S-GW1 is able to maintain the TA list and to perform the Paging processing by using the TA list. However, if it is not possible for the S-GW to receive the TA list from the MME1, the paging may be performed for the whole area supervised by the MME1. In this case, many of the radio network side resources would be consumed.

According to the present invention, the S-GW1 is able to maintain the RAI and to perform the Paging processing by using the RAI. If it is not possible for the S-GW1 to receive the RAI from the SGSN1, the paging may be performed for the whole area supervised by the SGSN. In this case, many of the radio network side resources would be consumed.

The disclosures of the aforementioned Non-Patent Documents are incorporated by reference herein. The particular exemplary embodiments or examples may be modified or adjusted within the gamut of the entire disclosure of the present invention, inclusive of claims, based on the fundamental technical concept of the invention. Further, a various types of combinations or selection of elements disclosed herein may be made within the framework of the claims. That is, the present invention may cover a wide variety of modifications or corrections that may occur to those skilled in the art in accordance with the entire disclosure of the present invention, inclusive of claim and the technical concept of the present invention.

The invention claimed is:

1. A communication method in a mobile network system that includes a mobility management node, a serving gateway serving as a bearer management node and a packet data network gateway, wherein the packet data network gateway is connected to an external network, the communication method comprising:

in case restarting of the mobility management node is performed, the bearer management node maintaining at least one specific S5/S8 bearer between the serving gateway and the packet data network gateway eligible for restoration of communication services triggered by the external network to a mobile terminal accommodated in the mobility management node; and the bearer management node removing all other S5/S8 bearers, wherein said specific bearer eligible for restoration of communication services is determined by said bearer management node based on an operator policy.

2. The communication method according to claim 1, further comprising:

in case the bearer management node maintains the specific S5/S8 bearer, the bearer management node starting a timer; and the bearer management node removing bearer resource(s) maintained, on timeout of the timer.

3. The communication method according to claim 1, further comprising:

the bearer management node maintaining location registration area information of the mobile terminal notified from the mobility management node, and identification information associated with the mobile terminal.

4. The communication method according to claim 3, further comprising:

on receipt of an incoming call to the mobile terminal after restarting of the mobility management node, the bearer management node notifying the mobility management node of the incoming call and of the location registration area information and the identification information the bearer management node maintains; and the mobility management node performing paging using the identification information for an area corresponding to the location registration area information.

5. The communication method according to claim 1, further comprising:

the bearer management node detecting restarting of the mobility management node;

the bearer management node confirming that the mobile terminal is accommodated in the mobility management node; and the bearer management node maintaining, in connection with the mobile terminal, the specific bearer that is set in a direction from the bearer management node to the external network.

6. The communication method according to claim 1, wherein the mobility management node includes a first mobility management node associated with a first communication system and a second mobility management node associated with a second communication system, the method further comprising:

performing location registration of the mobile terminal in the first and second mobility management nodes;

the bearer management node maintaining the location registration area information of the mobile terminal notified from the first and second mobility management nodes and the identification information associated with the mobile terminal;

the bearer management node, in case of detection of restarting of one of the first and second mobility management nodes, maintaining the specific S5/S8 bearer;

the bearer management node on receiving the incoming data sending to the restarted one of the first and second mobility management nodes a notification message inclusive of the identification information associated with the mobile terminal as a destination of the incoming data and the location registration area information; and the restarted one of the mobility management nodes performing paging including the identification information associated with the mobile terminal for an area corresponding to the location registration area information from the bearer management node.

7. The communication method according to claim 6, further comprising:

in case restarting occurs in both of the first and second mobility management nodes, the bearer management node maintaining all or a selected one of bearers set in a direction of from the bearer management node to the external network;

the bearer management node on receipt of incoming data sending to the first and second mobility management nodes a notification message inclusive of the identification information associated with the mobile terminal and the location registration area information; and the first and second mobility management nodes performing paging, inclusive of the identification information associated with the mobile terminal, for an area corresponding to the location registration area information from the bearer management node.

8. The communication method according to claim 1, further comprising:

the mobility management node informing one or a plurality of bearer management nodes about latest location registration area information per mobility event of the mobile terminal; and the bearer management node that detects restarting of the mobility management node by a health check mechanism maintaining all bearers or selected bearers and the identification information associated with the mobile terminal along with the location registration area information.

9. The communication method according to claim 8, further comprising:

the bearer management node starting a timer in case of maintaining the bearers, the identification information associated with the mobile terminal and the location registration area information; and the bearer management node removing the bearer, the identification information associated with the mobile terminal and the location registration area information that the bearer management node maintains, on timeout of the timer.

10. The communication method according to claim 8, further comprising:

the bearer management node on acquisition of the incoming data to the mobile terminal, with the bearer, identification information and the location registration area information of the mobile terminal being maintained by the bearer management node, sending to the mobility management node a notification message including the identification information associated with the mobile terminal and the location registration area information; and the mobility management node starting paging, including the identification information associated with the mobile terminal, for all areas of the location registration area information received from the bearer management node.

11. The communication method according to claim 10, wherein the mobile terminal starts an attach procedure on receipt of the paging.

12. A mobile network system, comprising:

a mobility management node that manages mobility of a mobile terminal;

a serving gateway serving as a bearer management node; and a packet data network gateway that is connected to an external network, wherein the bearer management node is adapted, in case restarting of the mobility management node is performed, to maintain at least one specific S5/S8 bearer between the serving gateway and the packet data network gateway eligible for restoration of communication services triggered by the external network to the mobile terminal accommodated in the mobility management node, and removes all other S5/S8 bearers, wherein said specific bearer eligible for restoration of communication services is determined by said bearer management node based on an operator policy.

13. The mobile network system according to claim 12, wherein in maintaining the specific S5/S8 bearer, the bearer management node starts a timer, and removes bearer resource(s) that the bearer management node maintains, on timeout of the timer.

14. The mobile network system according to claim 12, wherein the bearer management node maintains:

location registration area information of the mobile terminal notified by the mobility management node; and identification information associated with the mobile terminal.

15. The mobile network system according to claim 14, wherein, when there is an incoming call to the mobile terminal after restarting of the mobility management node, the bearer management node informs the mobility management node about the incoming call and about the identification information and the location registration area information that the bearer management node maintains, and the mobility management node performs paging, using the identification information, for an area corresponding to the location registration area information.

16. The mobile network system according to claim 12, wherein on detecting the restarting of the mobility management node by the bearer management node, the bearer management node confirms that the mobile terminal is accommodated in the mobility management node, and wherein the bearer management node maintains all bearers or at least one selected bearer as set in the direction of from the bearer management node to an external network in connection with the mobile terminal.

17. The mobile network system according to claim 12, wherein the mobility management node includes:

a first mobility management node associated with a first communication system; and a second mobility management node associated with a second communication system, wherein location registration of the mobile terminal is performed for the first and second mobility management nodes, wherein the bearer management node maintains the location registration area information notified from the first and second mobility management nodes, and the identification information associated with the mobile terminal, wherein the bearer management node, in case of detection of restarting of one of the first and second mobility management nodes does not release but maintains the specific S5/S8 bearer, wherein the bearer management node on subsequently receiving incoming data sends to the restarted one of the first and second mobility management nodes a notification message inclusive of the identification information associated with the mobile terminal as a destination of the incoming data and the location registration area information, and wherein the restarted one of the mobility management nodes performs paging inclusive of the identification information of the mobile terminal for an area corresponding to the location registration area information from the bearer management node.

18. The mobile network system according to claim 17, wherein in case both the first and second mobility management nodes are restarted, the bearer management node maintains all bearers or selected one of the bearers set in a direction of from the bearer management node side to an external network, wherein the bearer management node on receiving the incoming data sends a notification message inclusive of the identification information associated with the mobile terminal and the location registration area information to the first and second mobility management nodes, and wherein the first and second mobility management nodes perform paging inclusive of the identification information associated with the mobile terminal for an area corresponding to the location registration area information from the bearer management node.

19. The mobile network system according to claim 12, wherein the mobility management node informs the bearer management node about latest location registration area information per mobility event of the mobile terminal, and wherein the bearer management node that detects restarting of the mobility management node by a health check mechanism maintains all bearers or selected bearer(s) and the identification information associated with the mobile terminal along with the location registration area information.

20. The mobile network system according to claim 19, wherein the bearer management node starts a timer, in case of maintaining the bearers, the identification information associated with the mobile terminal and the location registration area information, and wherein the bearer management node removes the bearer(s), the identification information associated with the mobile terminal and the location registration area information that are maintained by the bearer management node, on timeout of the timer.

21. The mobile network system according to claim 19, wherein, when obtaining the incoming data, the bearer management node sends to the mobility management node a notification message inclusive of the identification information associated with the mobile terminal and the location registration area information, and wherein the mobility management node starts paging, inclusive of the identification information associated with the mobile terminal, for all areas of the location registration area information received from the bearer management node.

22. The mobile network system according to claim 21, wherein on receipt of the paging, the mobile terminal starts an attach procedure.

23. A node apparatus managing bearers and functioning as a serving gateway in a mobile network system which includes a mobility management node, said serving gateway, and a packet data network gateway, wherein the packet data network gateway is connected to an external network, the node apparatus comprising:

means adapted to maintain at least one specific S5/S8 bearer between the serving gateway and the packet data network gateway eligible for restoration of communication services triggered by the external network to a mobile terminal accommodated in a mobility management node, and removes all other S5/S8 bearers, when the mobility management node performs restarting thereof, wherein said specific bearer eligible for restoration of communication services is determined by said bearer management node based on an operator policy.

24. The node apparatus according to claim 23, wherein in case the specific bearer is maintained, the node apparatus starts a timer, and removes bearer resource(s) maintained, on timeout of the timer.

25. The node apparatus according to claim 23, wherein the node apparatus maintains:

location registration area information of the mobile terminal notified from the mobility management node; and identification information associated with the mobile terminal are maintained, wherein, when an incoming call to the mobile terminal is received after restarting of the mobility management node, the node apparatus notifies the incoming call to the mobility management node, and the node apparatus notifies the location registration area information and the identification information that are maintained by the node apparatus to the mobility management node.

26. The node apparatus according to claim 25, wherein in case of maintaining the bearer(s), the identification information associated with the mobile terminal and the location registration area information, the node apparatus starts a timer, and wherein the node apparatus removes the bearer(s) maintained, the identification information associated with the mobile terminal maintained and the location registration area information maintained, on timeout of the timer.

27. The node apparatus according to claim 23, wherein, when detecting restarting of the mobility management node, the node apparatus maintains all bearers or at least one selected bearer set in a direction of from the node apparatus to an external network.

28. A mobile terminal used in a mobile communication network, the mobile terminal comprising:

a receiver that receives paging from the mobile communication network based on location registration area information of the mobile terminal, upon arrival of an incoming call destined for the mobile terminal at the mobile communication network with a serving gateway in the mobile communication network, upon restarting of a mobility management node, including a Mobility Management Entity (MME) or a Serving GPRS Support Node (SGSN), in the mobile communication network, maintaining a specific S5/S8 bearer, while deleting other bearers and deleting the specific S5/S8 bearer in response to expiration of a duration for maintaining; and a transmitter that in response to the paging, re-attaches to the mobile communication network.

29. A communication method for a mobile terminal used in a mobile communication network, the method comprising:

receiving paging from the mobile communication network based on location registration area information of the mobile terminal, upon arrival of an incoming call destined for the mobile terminal at the mobile communication network with a serving gateway in the mobile communication network, upon restarting of a mobility management node, including a Mobility Management Entity (MME) or a Serving GPRS Support Node (SGSN), in the mobile communication network, maintaining a specific S5/S8 bearer, while deleting other bearers and deleting the specific S5/S8 bearer in response to expiration of a duration for maintaining; and re-attaching to the mobile communication network, in response to the paging.

* * * * *